(12) United States Patent
Dcruz et al.

(10) Patent No.: US 10,397,144 B2
(45) Date of Patent: Aug. 27, 2019

(54) RECEIVE BUFFER ARCHITECTURE METHOD AND APPARATUS

(71) Applicant: Intel Corporation, Santa Clara, CA (US)

(72) Inventors: Lloyd Dcruz, Salcette Goa (IN); Abhay H. Bathia, Pune (IN)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 15/389,172

(22) Filed: Dec. 22, 2016

(65) Prior Publication Data
US 2018/0183733 A1 Jun. 28, 2018

(51) Int. Cl.
*H04L 12/00* (2006.01)
*H04L 12/861* (2013.01)
*G06F 3/06* (2006.01)
*H04W 84/12* (2009.01)
*H04W 24/10* (2009.01)

(52) U.S. Cl.
CPC ........ *H04L 49/9005* (2013.01); *G06F 3/0679* (2013.01); *H04W 24/10* (2013.01); *H04W 84/12* (2013.01)

(58) Field of Classification Search
CPC ............. H04L 12/2409; H04L 12/2424; H04L 12/801; H04L 49/9005; H04L 12/861; H04L 12/863; G06F 3/0679; H04W 24/10; H04W 84/12
USPC ........................ 709/220, 223, 234, 236, 237
See application file for complete search history.

(56) References Cited

U.S. PATENT DOCUMENTS

| | | | | |
|---|---|---|---|---|
| 5,455,856 A | * | 10/1995 | Story | H04Q 1/145 379/29.01 |
| 6,246,684 B1 | * | 6/2001 | Chapman | H04L 29/06 370/363 |
| 6,304,553 B1 | | 10/2001 | Gehman et al. | |
| 6,747,984 B1 | | 6/2004 | Hoglund et al. | |
| 6,862,557 B2 | * | 3/2005 | Jones | H01L 22/20 257/E21.525 |

(Continued)

OTHER PUBLICATIONS

International Search Report and Written Opinion dated Mar. 9, 2018 for International Application No. PCT/US2017/061770, 16 pages.

*Primary Examiner* — Frantz Coby
(74) *Attorney, Agent, or Firm* — Schwabe, Williamson & Wyatt, P.C.

(57) ABSTRACT

Apparatus and method to facilitate delivery of data packets to compute nodes are disclosed herein. A receive buffer may store a first data packet associated with a first context, among a plurality of contexts, and a second data packet associated with a second context, among the plurality of contexts, wherein the first and second contexts identify respective first and second processes to be performed by a compute node in association with the respective first and second data packets, and wherein the receive buffer includes logic that is to determine that the compute node is unavailable to perform the first process with respect to the first data packet, determine that the compute node is available to perform the second process with respect to the second data packet, and read the second data packet for delivery to the compute node while the first data packet is retained.

25 Claims, 11 Drawing Sheets

(56) References Cited

U.S. PATENT DOCUMENTS

| | | | |
|---|---|---|---|
| 7,342,889 B2* | 3/2008 | Harrekilde-Petersen ................... H04L 12/43 370/236 | |
| 7,526,203 B2* | 4/2009 | Tamil ...................... H04L 45/00 398/47 | |
| 7,957,378 B2* | 6/2011 | Panigrahy ........... H04L 63/0254 370/392 | |
| 8,165,146 B1* | 4/2012 | Melick ................. H04B 1/7163 370/390 | |
| 8,189,407 B2* | 5/2012 | Strasser ................ G06F 3/0613 365/189.09 | |
| 8,780,796 B1* | 7/2014 | Ballal ................... H04W 76/12 370/328 | |
| 9,262,554 B1 | 2/2016 | Bailey et al. | |
| 9,305,184 B2* | 4/2016 | Mundra .................. G06F 21/72 | |
| 2003/0126188 A1* | 7/2003 | Ta ........................... H04L 29/06 718/108 | |
| 2008/0095119 A1* | 4/2008 | Bachmann ............ H04W 28/16 370/332 | |
| 2008/0254768 A1* | 10/2008 | Faccin .................. H04W 76/10 455/411 | |
| 2011/0227757 A1* | 9/2011 | Chen ..................... G08G 1/0104 340/902 | |
| 2013/0067111 A1 | 3/2013 | Archer et al. | |
| 2013/0121337 A1* | 5/2013 | Nguyen ................ H04W 40/12 370/392 | |
| 2014/0036702 A1* | 2/2014 | Van Wyk ................. H04B 3/46 370/252 | |
| 2014/0105218 A1 | 4/2014 | Anand et al. | |
| 2014/0185436 A1* | 7/2014 | Ajanovic ............. G06F 13/124 370/229 | |
| 2016/0127894 A1* | 5/2016 | Kahn .................... H04W 12/04 380/270 | |
| 2016/0295481 A1* | 10/2016 | Jayaraman ............ H04W 12/02 | |
| 2017/0054639 A1* | 2/2017 | Zhou ..................... H04W 92/02 | |
| 2017/0104671 A1* | 4/2017 | Zhang ................ H04L 12/4633 | |
| 2017/0339224 A1* | 11/2017 | Condeixa ............ H04W 76/10 | |
| 2017/0339510 A1* | 11/2017 | Condeixa ................ H04W 4/70 | |

* cited by examiner

Non-transitory computer-readable storage medium
1002

Programming Instructions or bit streams 1004
configured to cause a computer device, in response to execution of the programming instructions or bit streams, to practice one or more operations of the methods described in reference to Figures 1-8.

FIG. 10

RECEIVE BUFFER ARCHITECTURE METHOD AND APPARATUS

FIELD OF THE INVENTION

The present disclosure relates generally to the technical fields of computing and networks, and more particularly, to handling data movement within a network.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

A data center network may include a plurality of compute nodes which may communicate and exchange data with each other via a network, fabric, interconnections, or the like. The plurality of compute nodes may comprise processor nodes, storage nodes, input/output (I/O) nodes, and the like, each configured to perform one or more particular functions or particular types of functions. In some embodiments, a compute node may run multiple processes and may implement a plurality of processor cores. Incoming data packets may be categorized or assigned to particular processes to be performed by the compute node in accordance with the characteristics associated with the respective data packets. The incoming data packets may be placed in one or more buffers until they are ready to be handled by the compute node.

Unfortunately, bottlenecks may occur in moving the incoming data packets to appropriate processing resources at the compute node due to, for example, the quantity, size, and/or type of data packets relative to the processing speed and/or capacity of the processing resources of the compute node. For instance, in some embodiments, a first data packet associated with a first process to be performed may be in a queue (a buffer queue) ahead of a second data packet associated with a second process (different from the first process) to be performed. The processing resources associated with the first process may not be ready to receive the first data packet, while the processing resources associated with the second process may be available to handle the second data packet. However, due to the bottleneck at the processing resources associated with the first process, the first data packet may remain in the queue, thereby preventing subsequent data packets (such as the second data packet) from being delivered to available processing resources.

BRIEF DESCRIPTION OF THE DRAWINGS

Embodiments will be readily understood by the following detailed description in conjunction with the accompanying drawings. The concepts described herein are illustrated by way of example and not by way of limitation in the accompanying figures. For simplicity and clarity of illustration, elements illustrated in the figures are not necessarily drawn to scale. Where considered appropriate, like reference labels designate corresponding or analogous elements.

FIG. 10 illustrates an example non-transitory computer-readable storage media having instructions configured to practice all or selected ones of the operations associated with the processes described herein, according to some embodiments.

DETAILED DESCRIPTION

Figure 1:
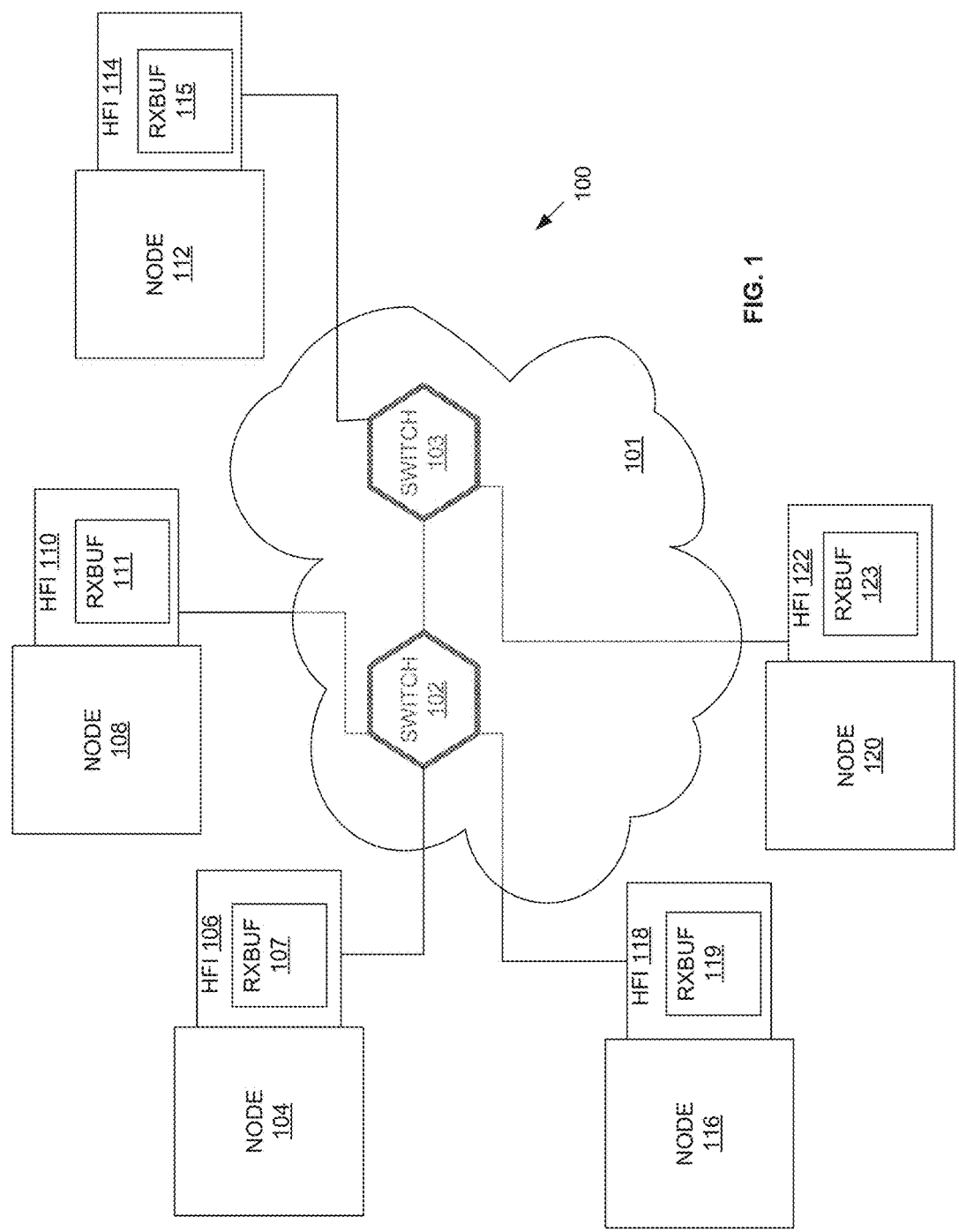
FIG. 1 depicts a block diagram illustrating a network view of an example system incorporated with a receive buffer architecture configured to provide improved data packet delivery of the present disclosure, according to some embodiments.

Embodiments of apparatuses and methods related to delivery of data packets based on specific processing contexts are described. In some embodiments, a receive buffer may store a first data packet associated with a first context, among a plurality of contexts, and a second data packet associated with a second context, among the plurality of contexts, wherein the first and second contexts identify respective first and second processes to be performed by a compute node in association with the respective first and second data packets, and the first and second data packets are stored in the receive buffer to be delivered to the compute node for operation of the first and second processes, wherein the receive buffer includes logic that is to determine that the compute node is unavailable to perform the first process with respect to the first data packet, determine that the compute node is available to perform the second process with respect to the second data packet, and read the second data packet for delivery to the compute node while the first data packet is retained. These and other aspects of the present disclosure will be more fully described below.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 depicts a block diagram illustrating a network view of an example system 100 incorporated with a receive buffer architecture configured to provide improved data packet delivery of the present disclosure, according to some embodiments. System 100 may comprise a computing network, a data center, a computing fabric, and the like. In some embodiments, system 100 may include a network 101 that includes a plurality of switches 102, 103; a plurality of compute nodes (also referred to as nodes) 104, 108, 112, 116, 120; and a plurality of compute node interfaces (also referred to as host fabric interfaces (HFIs)) 106, 110, 114, 118, 122. Compute node interfaces 106, 110, 114, 118, 122 may couple to the network 101, and in particular, to switches 102, 103. Compute node interfaces 106, 110, 114, 118, 122 may couple to respective compute nodes 104, 108, 112, 116, 120.

In some embodiments, network 101 may comprise switches, routers, firewalls, relays, interconnects, network management controllers, servers, memory, processors, and/or other components configured to interconnect compute nodes 104, 108, 112, 116, 120 to each other and facilitate their operation. Without limitation, data packets and messages may be provided from one compute node to another compute node among the plurality of compute nodes 104, 108, 112, 116, 120. FIG. 1 depicts switches 102, 103 as example network 101 components, but it is understood that network 101 is not so limited and additional and/or other components of the network 101 may couple to the compute node interfaces 106, 110, 114, 118, 122. The network 101 may also be referred to as a fabric, compute fabric, or cloud.

Each compute node of the plurality of compute nodes 104, 108, 112, 116, 120 may include one or more compute components such as, but not limited to, servers, processors, memory, routers, switches, gateways, relays, repeaters, and/or the like configured to provide at least one particular process or network service. A compute node may comprise a physical compute node, in which its compute components may be located proximate to each other, or a logical compute node, in which its compute components may be distributed geographically from each other such as in cloud computing environments. Similarly, compute nodes 104, 108, 112, 116, 120 may be geographically proximate or distributed from each other. Compute nodes 104, 108, 112, 116, 120 may comprise processor compute nodes, memory compute nodes, input/output (I/O) compute nodes, intermediating compute nodes, and/or the like. Compute nodes 104, 108, 112, 116, 120 may be the same or different from each other. Compute nodes 104, 108, 112, 116, 120 may also be referred to as nodes, network nodes, or fabric nodes. More or less than five compute nodes may be included in system 100. For example, system 100 may include hundreds or thousands of compute nodes.

In some embodiments, each compute node of the compute nodes 104, 108, 112, 116, 120 may include a plurality of processor cores to enable processing of data packets in parallel or may otherwise be able to handle processing of a plurality of data packets at the same time. The data packets to be processed may be processed the same or different from each other. When a compute node may be configured for a plurality of different processing functions or capabilities, each of the different processing functions/capabilities (or set of processing functions/capabilities) may be referred to as a context, process context, or receive context. One or more process resources included in the compute node may likewise be associated with respective contexts. Examples of contexts may include, without limitation, quality of service (QoS) or message passing interface (MPI) processes or applications.

Compute node interfaces 106, 110, 114, 118, 122 may be configured to deliver incoming data packets to and facilitate outgoing data packets from respective compute nodes 104, 108, 112, 116, 120. Compute node interfaces 106, 110, 114, 118, 122 may respectively include, without limitation, receive buffers (RXBUF or RBUF) 107, 111, 115, 119, 123, respectively, to provide improved handling of data packets to and from respective compute nodes 104, 108, 112, 116, 120, according to some embodiments. A receive buffer included in each of the compute node interfaces 106, 110, 114, 118, 122 may be configured to categorize, classify, and/or assign each incoming data packet to a particular context in accordance with one or more characteristics associated with the data packet. A data packet may include, without limitation, metadata, type information, identify process(es) to be performed, characteristics, and/or other information that may facilitate classification/categorization/assignment to a particular context. The receive buffer may use receive context mapping information to assign a data packet to a particular context.

The incoming data packets may be stored in one or more buffer queues included in the receive buffer along with associated information (including assigned contexts) to be appropriately delivered to the compute node, as described in detail below. The receive buffer may be configured to deliver data packets in the buffer queue(s) to non-blocked (e.g., available) process resources associated with contexts even when one or more data packets that may have arrived earlier in time to the buffer queue(s) may be associated with context(s) for which process resources may be blocked (e.g., unavailable) and hence may remain in the buffer queue(s). Head of line blockage associated with a first context need not prevent data packets associated with a second, third, and other non-blocked contexts from being delivered and processed by a compute node. Data packets associated with non-blocked contexts may be transferred to the compute node (e.g., host) ahead of data packets associated with blocked contexts even though data packets associated with non-blocked contexts arrived later in time then data packets associated with blocked contexts to the receive buffer. The receive buffer may be further configured to periodically attempt delivery of data packets associated with previously blocked context(s) so that previously blocked data packets may be delivered as associated process resources become available (e.g., change from blocked to unblocked).

Figure 2:
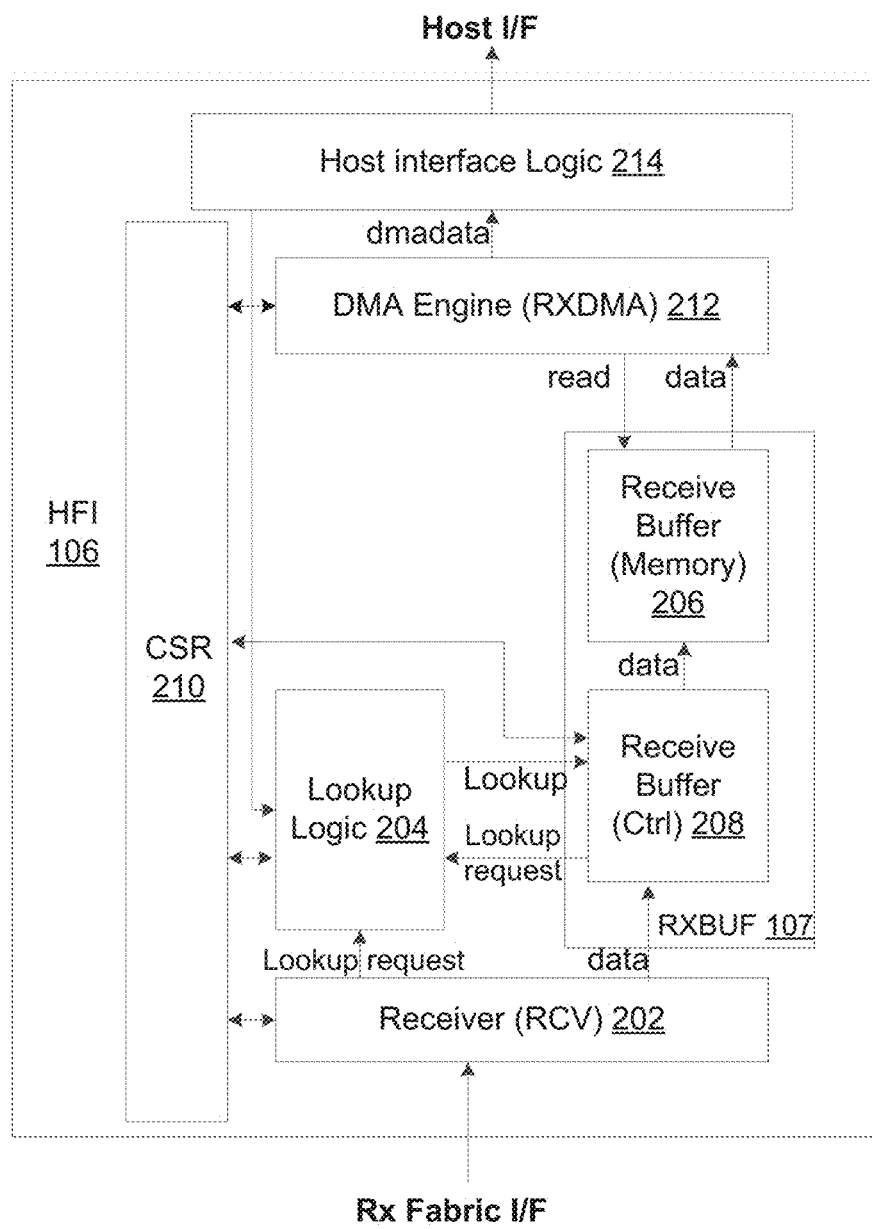
FIG. 2 depicts an example block diagram illustrating example components included in a compute node interface included in the system of FIG. 1, according to some embodiments.

FIG. 2 depicts an example block diagram illustrating example components included in the compute node interface 106, according to some embodiments. In some embodiments of the present disclosure, compute node interface 106 may include, without limitation, a receiver 202, the receive buffer 107, a lookup logic 204, a configuration and status register(s) (CSR) 210, a direct memory access (DMA) engine 212, and a host interface logic 214.

In some embodiments, a data packet (also referred to as a packet or data) may be provided to the compute node interface 106 (e.g., to a receive fabric interface of the compute node interface 106) from another compute node interface via the network 101. The incoming data packet may be received by the receiver 202. In response, the receiver 202 may communicate with the lookup logic to perform a lookup request associated with the received data packet and provide the data packet to the receive buffer 107. The lookup request may comprise identification of a particular host buffer location address to which the data packet may be delivered from the receive buffer 107 to the host compute node.

The receive buffer 107 may include, at a high level, a receive buffer memory portion 206 and a receive buffer control or controller portion 208. As described in detail below (e.g., FIG. 3), the incoming data packet and associated information may be stored in one or more buffers, memories, registers, and/or data structures of the receive buffer memory portion 206, and the receive buffer control/controller portion 208 may be configured to determine when to deliver which data packet and manage various status and state information associated with delivering data packets when one or more head of line data packets may be associated with blocked contexts. In order for the receive buffer 107 to perform the improved delivery technique of the present disclosure, communications may occur with the lookup logic 204. In some embodiments, the receive buffer 107 may comprise a first-in-first-out (FIFO) buffer, a ring buffer, a ring queue buffer, or the like.

The receive buffer 107 may communicate with the DMA engine 212 to selectively transmit data packets stored in the receive buffer memory portion 206 to the compute node 104, and to provide selective data packets in response to read requests from the DMA engine 212. In some embodiments, DMA engine 212 may facilitate access of data packets independent of (or with limited involvement of) a processor, and/or facilitate memory to memory copying or moving of data. The accessed data packets may, in turn, be provided to the host interface logic 214 from the DMA engine 212, and then to the compute node 104. The compute node 104 may be referred to as a "host" or host node with respect to the incoming data packet, as the recipient of the data packet. DMA engine 212 may also be referred to as a receive DMA (RXDMA) and/or may be associated with a RXDMA.

Each of the receiver 202, lookup logic 204, receive buffer 107, and DMA engine 212 may communicate with the CSR 210. In some embodiments, CSR 210 may be configured to facilitate routing of data packets, messages, commands, requests, and other communication between and among the receiver 202, lookup logic 204, receive buffer 107, DMA engine 212, and/or host interface logic 214.

In some embodiments, one or more of the receiver 202, receive buffer 107, lookup logic 204, CSR 210, DMA engine 212, and host interface logic 214 may be implemented as firmware or hardware such as, but not limited, to, an application specific integrated circuit (ASIC), programmable array logic (PAL), field programmable gate array (FPGA), circuitry, on-chip circuitry, on-chip memory, and the like. Alternatively, one or more of the receiver 202, receive buffer 107, lookup logic 204, CSR 210, DMA engine 212, and host interface logic 214 may be implemented as software comprising one or more instructions to be executed by one or more processors included in the same respective component with the one or more instructions or within the compute node interface 106. In some embodiments, the one or more instructions may be stored and/or executed in a trusted execution environment (TEE) of the respective components. In some embodiments, the TEE may be included in a dedicated core of respective components.

Although handling of a single data packet may be discussed above, it is contemplated that compute node interface 106 may receive a plurality of data packets. For instance, millions, billions, or more data packets may be received per unit of time (e.g., per second). Each of such data packets may be handled by the compute node interface 106 in accordance with the delivery technique of the present disclosure, according to some embodiments. Each of the compute node interfaces 106, 110, 114, 118, 122 and respective receive buffers 111, 115, 119, 123 may be similar to respective compute node interface 104 and receive buffer 107 described above.

Figure 3:
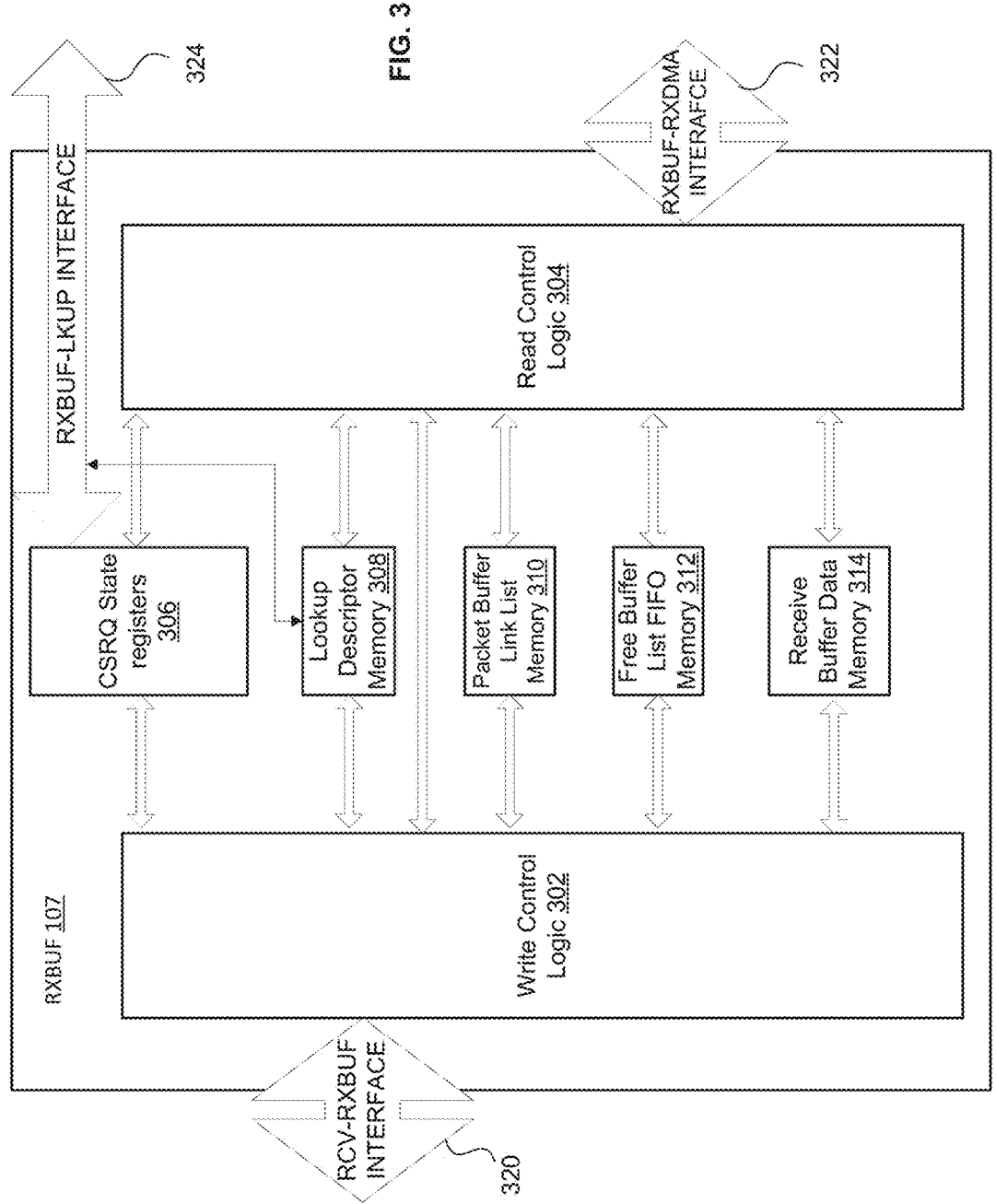
FIG. 3 depicts an example block diagram illustrating example components included in a receive buffer, according to some embodiments.

FIG. 3 depicts an example block diagram illustrating example components included in the receive buffer 107, according to some embodiments. The receive buffer 107 may include, without limitation, write control logic 302, read control logic 304, context specific receive queue (CSRQ) state registers 306, lookup descriptor memory 308, packet buffer link list (PBLL) memory 310, free buffer list FIFO (FBLF) memory 312, receive buffer data memory 314, receiver-receive buffer (RCV-RXBUF) interface 320, receive buffer-receive DMA (RXBUF-RXDMA) interface 322, and receive buffer-lookup (RXBUF-LKUP) interface 324.

In some embodiments, each of the write control logic 302 and the read control logic 304 may be configured to communicate with any of the CSRQ state registers 306, lookup descriptor memory 308, PBLL memory 310, FBLF memory 312, and the receive buffer data memory 314. Write control logic 302 and read control logic 304 may communicate with each other. Write control logic 302 may be further configured to communicate with the RCV-RXBUF interface 320, which in turn, may communicate with the receiver 202 (see FIG. 2). Data packets received by the receiver 202 may, for example, be provided to the write control logic 302 via the RCV-RXBUF interface 320. In response, the write control logic 302 may control how each of the received data packets is to be written into the receive buffer 107, and update, change, affect, access, and/or otherwise communicate with one or more of the CSRQ state registers 306, lookup descriptor memory 308, PBLL memory 310, FBLF memory 312, and receive buffer data memory 314 in accordance with the improved technique for handling data packets of the present disclosure.

Read control logic 304 may be configured to communicate with the DMA engine 212 via the RXBUF-RXDMA interface 322. Data packets queued in the receive buffer 107 may be read out to the DMA engine 212, which may then be delivered to the associated host compute node. In connection with delivering the queued data packets, the read control logic 304 may update, change, affect, access, and/or otherwise communicate with one or more of the CSRQ state registers 306, lookup descriptor memory 308, PBLL memory 310, FBLF memory 312, and receive buffer data memory 314.

Each of the CSRQ state registers 306 and the lookup descriptor memory 308 may be configured to communicate with the lookup logic 204 (see FIG. 2) via the RXBUF-LKUP interface 324. Lookup of certain memory location addresses, availability of memory location addresses, and the like may occur among the CSRQ state registers 306, lookup descriptor memory 308, and/or lookup logic 204 in connection with read and write operations carried out by the read control logic 304 and write control logic 302.

In some embodiments, each data packet received by the write control logic 302 may include one or more associated information such as, but not limited to, identification of a particular context among the plurality of contexts. The particular context may be determined by the receiver 202 based on the characteristic(s) of the data packet. As discussed above, each context of the plurality of contexts may be associated with a particular process to be performed at the host compute node using the data packet. Upon receipt of each data packet, the write control logic 302 may decode the data packet to identify the associated context (or otherwise extract the context information), and the data packet may be queued on a context basis. In alternative embodiments, context associated with a data packet may be determined by a component other than the receiver 202 such as the receive buffer 107.

Data packets may be handled by one or more components within the receive buffer 107 in accordance with data structures and handling "rules" (e.g., reads, writes, housekeeping) of embodiments of the present disclosure. Incoming data packets may be stored or buffered within the receive buffer data memory 314. In some embodiments, the receive buffer data memory 314 may be organized as a plurality of buffer credits, in which each buffer credit of the plurality of buffer credits may comprise a pre-defined memory size. For example, a buffer credit may be defined as 64 bytes, less than 64 bytes, or more than 64 bytes. At least one buffer credit may be allocated to store a data packet even if the size of the data packet may be less than the pre-defined buffer credit size. For example, a 30 byte data packet may be allocated to a buffer credit of a 64 byte size, and no other data packet may occupy the remaining memory space within that buffer credit. Conversely, if a data packet's size is larger than the pre-defined buffer credit size, than more than one buffer credits may be allocated for the data packet. For a 100 byte data packet, for instance, the first 64 bytes of the 100 byte data packet may be allocated to a first buffer credit of a 64 byte size and the remaining 36 bytes of the 100 byte data packet may be allocated to a second buffer credit of a 64 byte size. The first and second buffer credits may or may not be contiguous memory addresses or space within the receive buffer data memory 314.

The capacity of the receive buffer data memory 314 may be referred to as RbufCap (in bytes); the maximum number of buffer credits may be referred to as MaxBuffNo, which may be RbufCap/pre-defined buffer credit size; the maximum number of contexts may be referred to as MaxCntxNum; the pre-defined buffer credit size may be referred to as the receive buffer width; and when the pre-defined buffer credit size is defined as 64 bytes, a DWORD-valid field or flag may be 4 bits (as discussed in detail below).

In some embodiments, each portion of the receive buffer data memory 314 organized as buffer credits may be referenced by a unique buffer number. The buffer numbers may be, for example, 0, 1, 2, 3, 4, and so forth up to MaxBuffNo-1. The buffer numbers may also be referred to as buffer addresses, buffer credit identifier, or the like. Although all incoming data packets regardless of its context may be buffered in the receive buffer data memory 314, the context associated with each data packet may be relevant in configuring one or more of the CSRQ state registers 306, lookup descriptor memory 308, PBLL memory 310, and/or FBLF memory 312.

The CSRQ state registers 306, also referred to as a CSRQ or context specific table, may be configured to maintain information regarding the data packets buffered in the receive buffer data memory 314 on a context basis (collectively referred to as the CSRQ). For each context of the plurality of contexts, the following information may be maintained in a table format, a plurality of fields, or other suitable data structure of the CSRQ. Because the table (or equivalent) may include a row for each of the contexts, the depth of the table may equal MaxContxNum. In some embodiments, the information may be maintained in registers. For purposes of the description herein, the pre-defined buffer credit size may be deemed to be 64 bytes, although other sizes may be implemented.

(1) Head buffer pointer (log [MaxBuffNo]): Buffer number associated with the head or first data packet buffered for a particular context in the receive buffer data memory 314. Whenever an incoming data packet may be the head/first data packet associated with a particular context to be buffered, the head buffer pointer may be updated with a start of packet buffer (SOP) buffer number for such data packet. Conversely, whenever the head/first data packet of the particular context may be read out to the host compute node, the head buffer pointer may be updated with the SOP buffer number of the next data packet buffered for the particular context.

(2) Tail buffer pointer (log [MaxBuffNo]): This field may be updated whenever an incoming data packet is buffered within the receive buffer data memory 314. The tail buffer pointer may be updated to specify the particular buffer number at which the last portion of the last data packet associated with a particular context is buffered. In some embodiments, the tail buffer pointer may also be used to "stitch," connect, or link the "tail" buffer number of the immediately previous buffered data packet of the particular context to the "head" buffer number of the next incoming data packet being buffered for the particular context. By maintaining the "head" and "tail" buffer numbers in this manner, a linked list of buffered data packets for a particular context may be generated.

(3) Number of packets (log [MaxBuffNo]+1): This field may be updated when the host buffer location lookup completes for the incoming data packet, indicative of a count of the number of data packets associated with the particular context. The field may be incremented irrespective of the host buffer location availability and may decrement when a data packet has been read out to the host for that context.

(4) Host buffer location valid (1 bit): This field may indicate whether the data packet at the head of the context queue may be arbitrated for eviction or delivery to the host. The host buffer location valid indication may also be referred to as a host buffer location flag.

(5) End of packet (EOP)-DWORD-valid (5 bits): This field may be associated with the head data packet SOP buffer for the particular context. When the head/first data packet for the particular context may be a single buffer credit size packet, then a flag for this field may be set to one. Otherwise, the flag may be set to zero. The EOP-DWORD-valid indication may also be referred to as an EOP flag.

In some embodiments, the lookup descriptor memory 308 may be configured to maintain the required information to perform host buffer location lookups. The required information, which may be referred to as the lookup descriptor or the host buffer location lookup descriptor, may include, without limitation, a host buffer location address lookup valid bit along with the context associated with the data packet. Such lookup descriptor may be stored at the SOP buffer location of each data packet.

In some embodiments, the PBLL memory 310 may be configured to store a next buffer link list and next buffer EOP flag list associated with data packets buffered in the receive buffer data memory 314. Such information may be maintained in a table, a plurality of fields, or other suitable data structure within the PBLL memory 310.

(1) Next buffer link list (depth of log [MaxBuffNo]): This list identifies, for respective buffer numbers, the immediate next buffer number in which an incoming data packet is being stored. The list may be updated whenever a particular buffer credit may be consumed by an incoming data packet. For example, a first data packet associated with a first context may be stored in buffer numbers 0, 1, 2, 3, and 4, and then a second data packet associated with the first context arrives after the first data packet. Assuming that the second data packet is stored in buffer numbers 10, 11, 12, 13, 14, and 15, the next buffer link list at buffer number 4 (the last buffer number associated with the first data packet) may identify buffer number 10 (the first buffer number associated with the second data packet), thereby specifying the link or commonality in context between the first and second data packets. The next buffer link list may also be referred to as the buffer link list.

(2) Next buffer EOP list (1 bit per buffer number): For the second to last buffer number associated with each incoming data packet being buffered, a flag may be set to one to indicate that the end of the given data packet is imminent. For the remaining buffer numbers, flags may be set to zero. When an incoming data packet comprises a single buffer credit data packet, the flag associated with the last buffer number of the immediately previous data packet of the same context may be set to one. And if an incoming data packet comprises a single buffer credit data packet and the only data packet for a given context buffered in the receive buffer data memory 314, then the EOP flag for the data packet may be specified in the CSRQ state registers 306 (e.g., within the EOP-DWORD-valid field). This may be done to avoid latency in the read pipe.

The PBLL memory 310 may comprise a two port memory, in which one port may comprise a write port and the other port may comprise a read port. The write port of the PBLL memory 310 may be used by the write control logic 302 to update the next buffer link list and EOP-DWORD-valid in accordance with incoming data packets, while the read port may be used by the read control logic 304 to facilitate read out of buffered data packets to the host compute node.

The FBLF memory 312 may maintain a free buffer FIFO list having a size of log [MaxBuffNo]×MaxBuffNo, in some embodiments. The free buffer FIFO list may be maintained in a table, a plurality of fields, or other suitable data structure. The free buffer FIFO list may identify which of the particular buffer numbers or addresses may currently be available or free to store a data packet. Additionally, among the available or free buffer numbers identified in the free buffer FIFO list, a particular buffer number comprises the current head/first free buffer credit available or free to which a data packet may be stored (referred to as the head free buffer pointer) and which of the particular buffer number comprises the current tail/last free buffer credit to which a data packet may be stored (referred to as the tail free buffer pointer). In some embodiments, the head and tail free buffer pointers may be maintained in registers within the FBLF memory 312.

When a data packet arrives to be buffered, the (first) buffer number that may be free or available to store such data packet may be read out from the head of the FIFO list (e.g., the head free buffer pointer). Whenever the DMA engine 212 reads out a data packet that has been buffered, the free/read out buffer may be appended to the FIFO list at the tail pointer. Such implementation of the FBLF memory 312 facilitates simultaneous reads and writes to the receive buffer data memory 314 in every cycle.

The FBLF memory 312 may comprise a two port memory, in which one port may comprise a write port and the other port may comprise a read port. The write port of the FBLF memory 312 may be used by the write control logic 302 to update the free buffer FIFO list while the read port may be used by the read control logic 304 to read data included in the free buffer FIFO list.

In some embodiments, an entry counter may be maintained on a per context basis to support cut-through mode. Such entry counter may be provided in the write control logic 302 or in one or more of the other components included in the receive buffer 107. An incoming data packet may be presented to the host compute node before the entire data packet may arrive in the receive buffer data memory 314. Whenever a sufficient amount of the data associated with the incoming data packet has been received so that the data packet may be mapped (e.g., analyzed to determine its associated context) to a particular context among the plurality of (active) contexts, the data packet may be presented to the DMA engine 212 for transmission to the host compute node.

Additionally, in some embodiments, to support error correction for reads from the buffer link list (in the PBLL memory 310), three clock pipelines may be added to the memory read cycles. Two separate memories, the PBLL memory 310 and the FBLF memory 312, may be implemented to support simultaneous reads to and writes from the receive buffer data memory 314.

In some embodiments, one or more of the write control logic 302, read control logic 304, context specific receive queue (CSRQ) state registers 306, lookup descriptor memory 308, packet buffer link list (PBLL) memory 310, free buffer list first-in-first-out (FIFO) (FBLF) memory 312, receive buffer data memory 314, receiver-receive buffer (RCV-RXBUF) interface 320, receive buffer-receive DMA (RXBUF-RXDMA) interface 322, and receive buffer-lookup (RXBUF-LKUP) interface 324, as configured above, may be implemented as firmware or hardware such as, but not limited, to, an application specific integrated circuit (ASIC), programmable array logic (PAL), field programmable gate array (FPGA), circuitry, on-chip circuitry, on-chip memory, and the like. Alternatively, one or more of the write control logic 302, read control logic 304, context specific receive queue (CSRQ) state registers 306, lookup descriptor memory 308, packet buffer link list (PBLL) memory 310, free buffer list first-in-first-out (FIFO) (FBLF) memory 312, receive buffer data memory 314, receiver-receive buffer (RCV-RXBUF) interface 320, receive buffer-receive DMA (RXBUF-RXDMA) interface 322, and receive buffer-lookup (RXBUF-LKUP) interface 324 may be implemented as software comprising one or more instructions to be executed by one or more processors included in the same respective component with the one or more instructions, in the receive buffer 107, of the like. In some embodiments, the one or more instructions may be stored and/or executed in a trusted execution environment (TEE) of the respective components. In some embodiments, the TEE may be included in a dedicated core of respective components.

Figure 4:
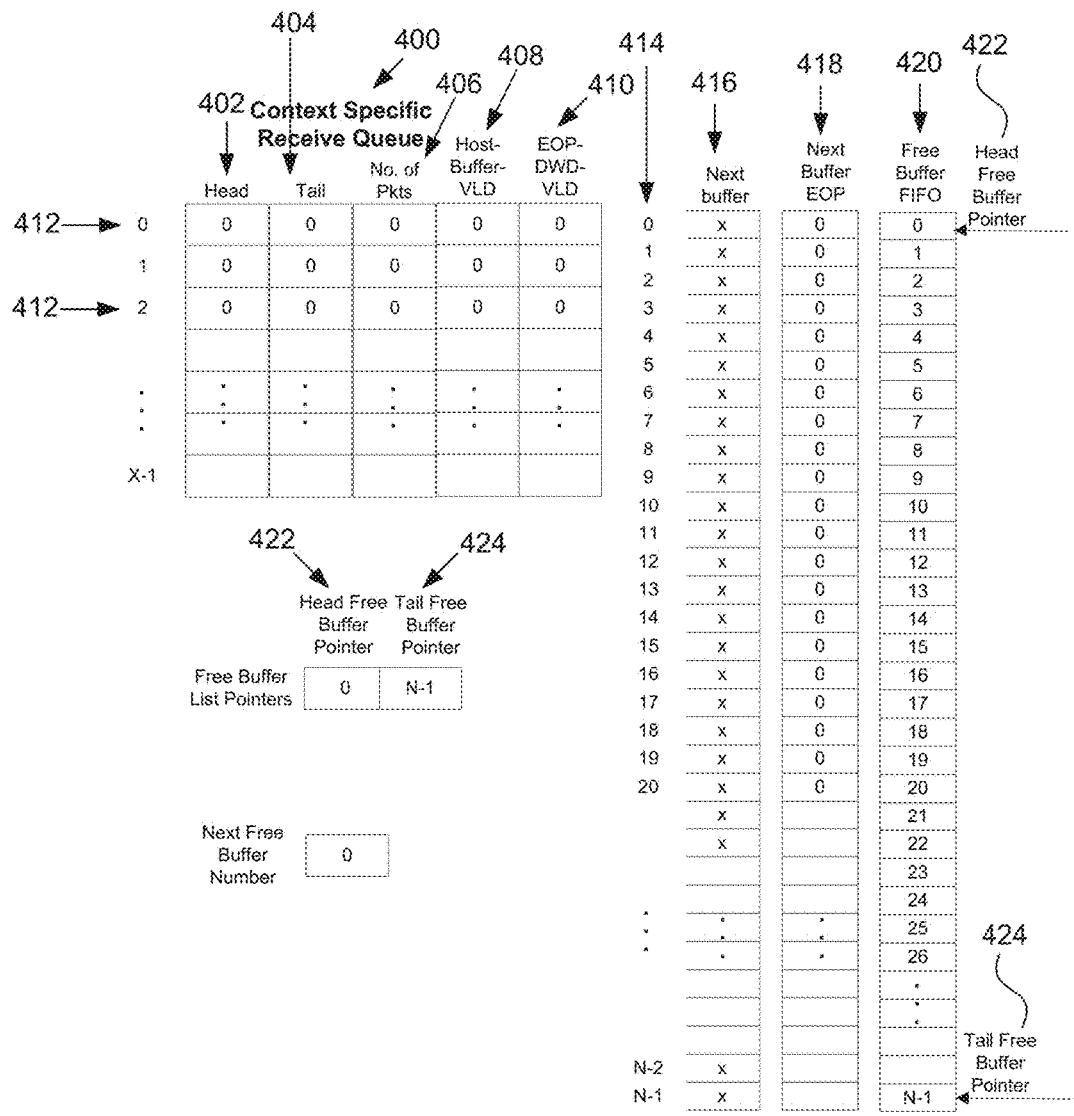
FIG. 4 illustrates an example depiction of data structures implemented within the receive buffer of FIG. 3, according to some embodiments.

FIG. 4 illustrates an example depiction of the tables, registers, lists, and/or pointers (collectively referred to as data structures) implemented within the CSRQ state registers 306, PBLL memory 310, and FBLF memory 312, according to some embodiments. FIG. 4 depicts the initial conditions of (or values within) the data structures, such as upon installation, initialization, or reset of the system 100.

The CSRQ included in the CSRQ state registers 306 (e.g., CSRQ 400) may be depicted as a table, including a column 402 for the head buffer pointer field, a column 404 for the tail buffer pointer field, a column 406 for the number of packets field, a column 408 for the host buffer location valid field, and a column 410 for the EOP-DWORD-valid field. Each row 412 of the table may correspond to a particular context of the plurality of contexts. For example, context 0, context 1, context 2, . . . , up to context X−1 may be represented in the table. As shown, the initial condition or values within the CSRQ 400 may be set to zero.

The next buffer link list 416 and the next buffer EOP list 418 included in the PBLL memory 310 may also be initially set to zero or null values. The plurality of fields of each of the next buffer link list 416 and the next buffer EOP list 418 may be associated with respective buffer numbers 0 to N−1 (e.g., buffer numbers 414) of the receive buffer data memory 314. The free buffer FIFO list 420 included in the FBLF memory 312 may also include a plurality of fields associated with respective buffer numbers 0 to N−1. Because the system 100 may be in an initial state, all of the buffer credits (e.g., buffer numbers 0 through N−1) may be available/free for incoming data packets. Accordingly, as shown in FIG. 4, buffer numbers 0 through N−1 may incrementally populate respective fields of the free buffer FIFO list 420. The head free buffer pointer 422 (pointing to buffer number 0) and tail free buffer pointer 424 (pointing to buffer number N−1, which is the MaxBuffNo) may comprise the initial pointer values.

In some embodiments, the head and tail free buffer pointers 422, 424 may be for the plurality of contexts. Alternatively, the head and tail free buffer pointers 422, 424 may be provided for each context of the plurality of contexts.

Figure 5:
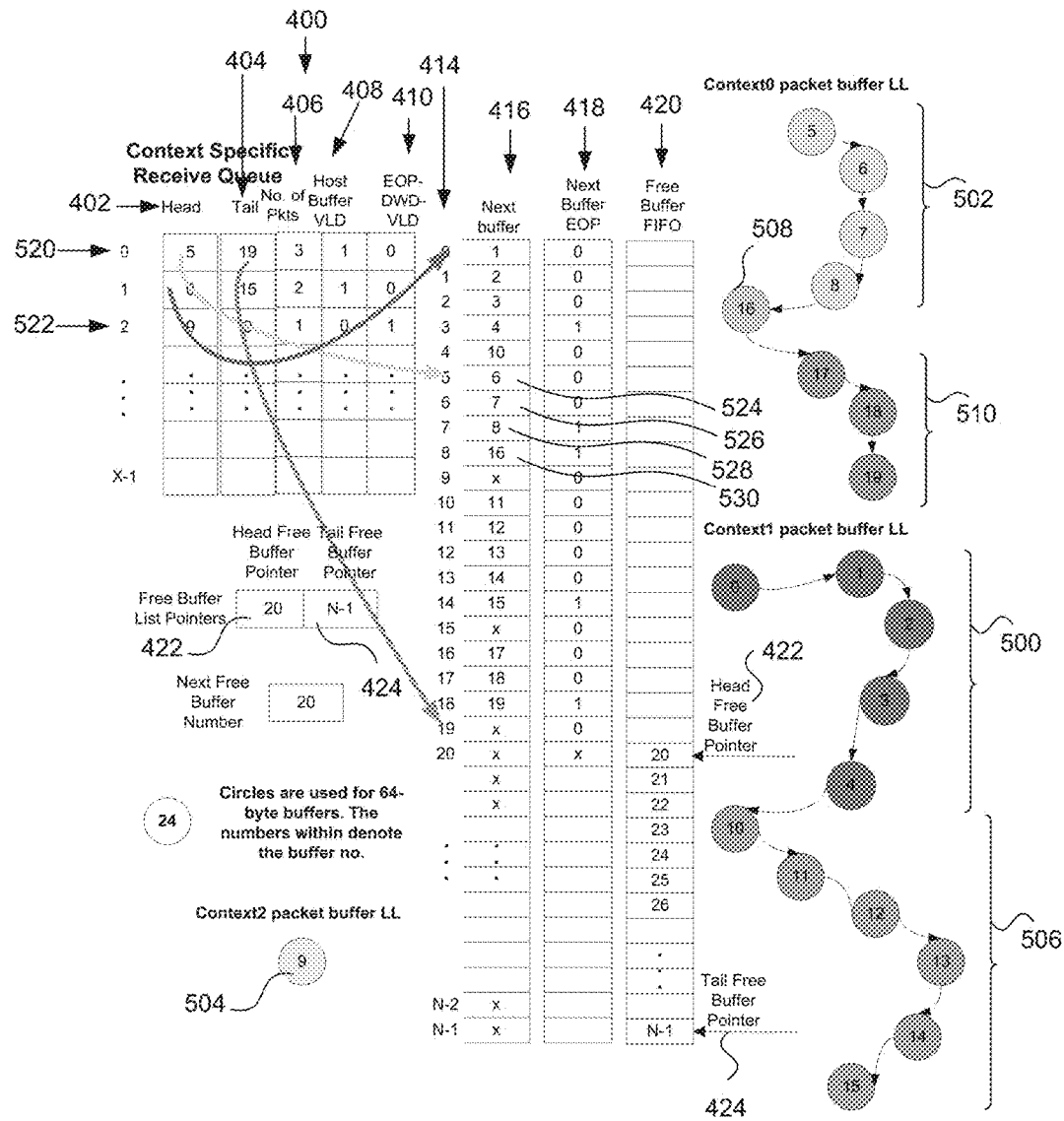
FIG. 5 illustrates an example depiction of the contents or state of the data structures shown in FIG. 4 after reception of six data packets, according to some embodiments.

FIG. 5 illustrates an example depiction of the contents or state of the data structures shown in FIG. 4 after reception of six data packets, according to some embodiments. In this example, the six data packets may be received and buffered in the receive buffer data memory 314 in the following order: a first data packet 500 associated with context 1 and stored in buffer numbers 0 through 4, a second data packet 502 associated with context 0 and stored in buffer numbers 5 through 8, a third data packet 504 associated with context 2 and stored in buffer number 9, a fourth data packet 506 associated with context 1 and stored in buffer numbers 10 through 15, a fifth data packet 508 associated with context 0 and stored in buffer number 16, and a sixth data packet 510 associated with context 0 and stored in buffer numbers 17 through 19.

As shown in FIG. 5, the CSRQ 400 may include updated values to reflect the size buffered data packets. For example, row 520 associated with context 0 includes buffer number "5" in column 402 to specify that buffer number 5 may be the head or first buffer number in which a data packet associated with context 0 (in the context 0 link) may currently be stored (e.g., second data packet 502 stored starting in buffer number 5); buffer number "19" in column 404 to specify that buffer number 19 may be the tail or last buffer number in which the current data packet associated with context 0 (in the context 0 link) may currently be stored (e.g., sixth data packet 510 stored ending in buffer number 19); a count of "3" in column 406 to indicate that three data packets (e.g., data packets 502, 508, and 510) may be currently stored for context 0; a value of "1" in column 408 to indicate that the data packet associated with context 0 at the head of the context 0 queue (e.g., second data packet 502) may be arbitrated for delivery to the host; and a value of "0" in column 410 to indicate that the head data packet of context 0 (e.g., second data packet 502) is not a single buffer credit data packet and as such, an EOP indicator exists in the appropriate field of the next buffer EOP list 418. The field of the next buffer EOP list 418 associated with buffer number 7 is shown with a value of "1" to indicate buffer number 7 being the second to last buffer credit among which the second data packet 502 may currently be stored.

In row 522 associated with context 2, the host buffer location valid field of column 408 may be set to "0" to indicate that the head data packet associated with context 2 (e.g., third data packet 504) may not be arbitrated for eviction from the receive buffer data memory 314 to be delivered to the host at the current time because of unavailability of resource(s) at the host side to receive the data packet. Column 410 of row 522 also shows that a value of "1" to indicate that the head data packet for this context comprises a single buffer credit data packet (e.g., third data packet 504 is shown entirely buffered within buffer number 9) and no EOP indicator may correspondingly exist in the next buffer EOP list 418.

The values within the next buffer link list 416 may identify the linkage or link list of data packets for each of the contexts for which data packets may currently be buffered. Continuing the example of data packets associated with context 0, a field 524 of the next buffer link list 416 associated with buffer number 5 may include buffer number "6" to indicate that buffer number 6 is the immediately next buffer number following buffer number 5 in which a data packet associated with context 0 is being buffered (see second data packet 502 located at buffer numbers 5 through 8). Incrementally, a field 526 associated with buffer number 6 may indicate buffer number "7" to be the next buffer number in the linkage, and a field 528 associated with buffer number 7 may indicate buffer number "8" to be the next buffer number in the linkage. A field 530 associated with buffer number 8, the last buffer number in which the second data packet 502 may be stored, may include buffer number "16," to indicate the link from the last buffer number of second data packet 502 to the first buffer number of the fifth data packet 508. In this manner, the linkage or link list of buffered data packets for each of the contexts may be defined.

Because these six data packets occupy buffer numbers 0 through 19, the next available or free buffer number may be buffer number 20. Such buffer number may be indicated as free in the free buffer FIFO list 420 (see field value corresponding to buffer number 20) along with the rest of the available buffer numbers (e.g., 21 through N−1). Likewise, the head free buffer pointer 422 points to buffer number 20 and the tail free buffer pointer 424 may point to buffer number N−1.

Figure 6:
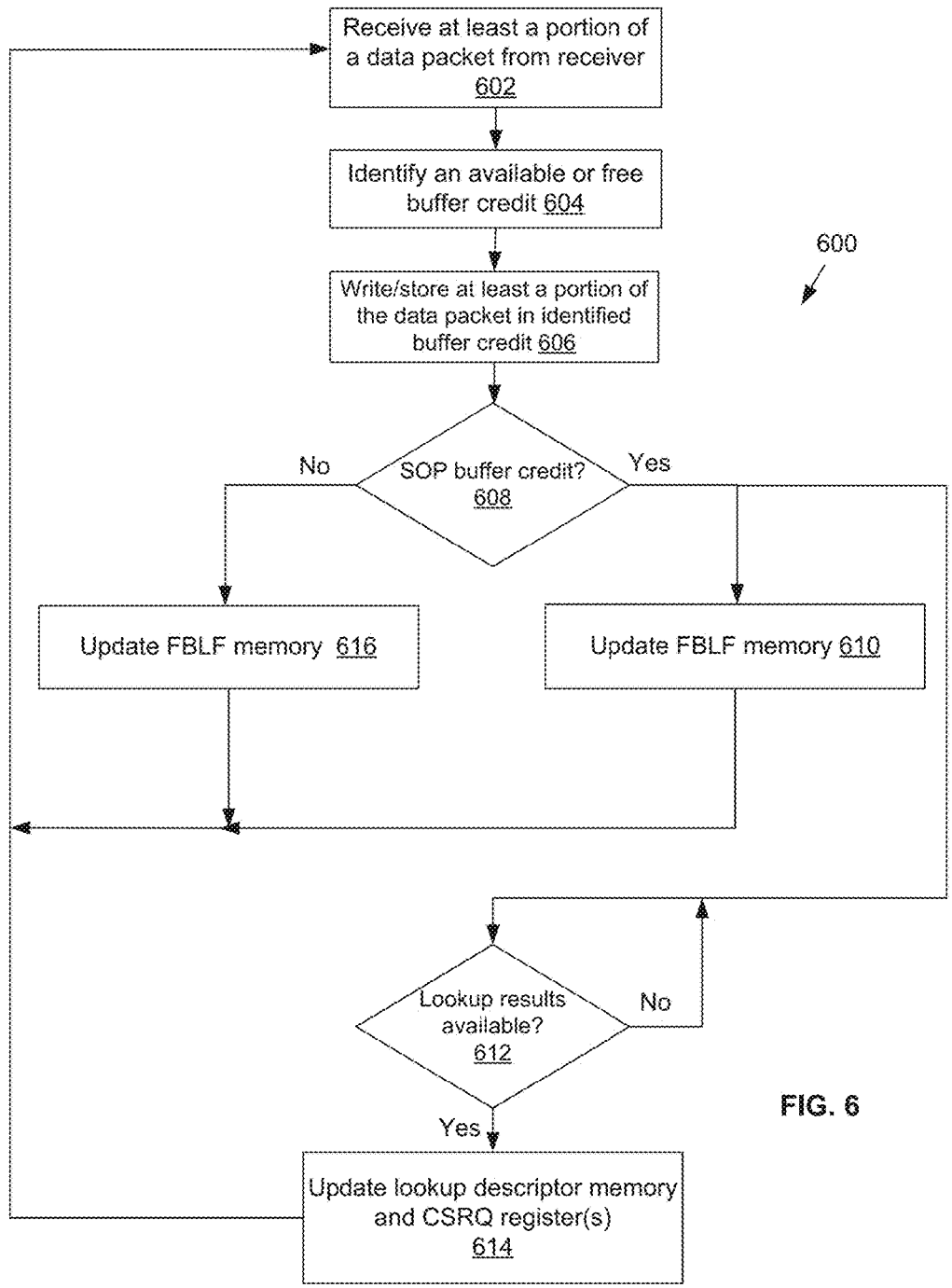
FIG. 6 depicts an example process that may be performed by a receive buffer to write or store an incoming data packet for a particular context in accordance with the data structures set forth herein, according to some embodiments.

FIG. 6 depicts an example process 600 that may be performed by a receive buffer (e.g., receive buffer 107) to write or store an incoming data packet for a particular context in accordance with the data structures set forth herein, according to some embodiments.

At a block 602, at least a portion of an incoming data packet may be received by the receive buffer 107 from the receiver 202 via the RCV-RXBUF interface 320. In some embodiments, the at least a portion of the incoming data packet may be received by the write control logic 302 included in the receive buffer 107. The incoming data packet may be delivered to the receive buffer 107 commiserate with transmission and receipt capabilities of the receiver 202 and receive buffer 107, respectively, even if not all of the data packet has been received at the receiver 202. Hence, the data packet (especially if it of a large size that is greater than a buffer credit size), may be received and handled as a plurality of chunks or portions. Process 600 may be implemented a plurality of times, once for each chunk/portion of the data packet until the end of the data packet has been received. In some embodiments, the at least a portion of the data packet received may comprise a maximum data size that is the same as the buffer credit size.

At a block 604, in response to receipt of the at least a portion of the data packet, the write control logic 302 may access the FBLF memory 312 to identify an available or free buffer credit into which the at least a portion of the data packet may be buffered. In some embodiments, the head free buffer pointer may be used to identify the available or free buffer credit. With the available/free buffer credit identified, the write control logic 302 may write or store the at least a portion of the data packet received into that buffer credit location, at a block 606.

Next, a number of data structures may be updated to reflect the write operation in block 606. At a block 608, whether the identified buffer credit in which the write operation occurred in block 606 may be the SOP for the data packet may be checked. When the identified buffer credit comprises the first or starting buffer credit for the data packet (overall) (yes branch of block 608), then process 600 may proceed to both blocks 610 and 612.

At block 610, the write control logic 302 may communicate with and update the FBLF memory 312 in accordance with the write operation. For example, without limitation, the tail free buffer pointer in the FBLF memory 312 may be updated to reflect the now unavailability of the identified buffer credit. The head free buffer pointer in the FBLF memory 312 may also be updated as appropriate. In some embodiments, the next buffer EOP list of the FBLF memory 312 may also be updated as appropriate. Upon completion of block 610, process 600 may proceed to block 602.

At block 612, the write control logic 302 and/or in conjunction with the lookup logic 204 may query whether lookup results or description associated with the data packet may be available. The lookup results or description (also referred to as the lookup descriptor) may be included with or appended to the data packet, and may specify the host buffer location address lookup valid bit along with the particular context of the data packet. If lookup results may be unavailable (no branch of block 612), then process 600 may repeat the query of branch 612 until lookup results become available. When lookup results may be available (yes branch of block 612), then process 600 may proceed to a block 614, in which the write control logic 302 and/or the lookup logic 204 may be configured to update the lookup descriptor memory 308, and the write control logic 302 may be configured to update the CSRQ state registers 306. For example, the lookup results may be stored in the lookup descriptor memory 308. The number of data packets field in the CSRQ state registers 306 associated with the particular context may be incremented. Upon completion of block 614, the process 600 may return to block 602 to handle the next at least a portion of the given data packet.

Returning to block 608, when the identified buffer credit does not comprise the first or starting buffer credit for the data packet (overall) (no branch of block 608), then process 600 may proceed to block 616. At block 616, the write control logic 302 may be configured to update the FBLF memory 312 in accordance with the write operation. For example, without limitation, the tail free buffer pointer field in the FBLF memory 312 may be updated. Upon completion of block 616, the process 600 may return to block 602 to handle the next at least a portion of the given data packet.

Process 600 may be repeated, as necessary, to buffer all chunks/portions of the given data packet into the receive buffer data memory 314. Process 600 may also be performed (one or more times) for each of the incoming data packets, in some embodiments.

In some embodiments, example six data packets buffered in the receive buffer data memory 314 and their associated values in the data structures, as shown in FIG. 5, may be written in accordance with the process 600 of FIG. 6. To further describe details regarding the writing operations associated with these six data packets, three contexts from among a plurality of contexts may be active (e.g., processes associated with these three contexts may be capable of being handled by the host compute node)—context 0 (also referred to as CNTX0), context 1 (also referred to as CNTX1), and context 2 (also referred to as CNTX2). The six incoming data packets may be received in the following sequence or order: CNTX1PKT0 (the first data packet 500 and which may require five buffer credits to be completely written into the receive buffer data memory 314)->CNTX0PKT0 (the second data packet 502 and which may require four buffer credits)->CNTX2PKT0 (the third data packet 504 and which may require one buffer credit)->CNTX1PKT0 (the fourth data packet 506 and which may require six buffer credits)->CNTXOPKT1 (the fifth data packet 508 and which may require one buffer credit)->CNTXOPKT2 (the sixth data packet 510 and which may require three buffer credits).

The following operations may occur in connection with writing the six data packets.

1. When CNTX1PKT0 arrives at the receive buffer 107, a next free buffer credit number fetch may be requested and the incoming data packet's first 64 bytes of data may be written to the buffer number pointed to by the Next Free Buffer Number register, which in this case may be "0" (at initialization, the first available/free buffer credit may be buffer number 0). The next buffer pipe may be adjusted in such a way that by the time the next 64 bytes of the data packet data arrives, the next free buffer number may be available from FBLF memory 312. At the same time, the next free buffer credit number fetch may be requested for the next portion of the data packet CNTX1PKT0.

2. In CSRQ 400, for context 1, the Head buffer pointer field (column 402), Tail buffer pointer field (column 404), and the number of packets field (column 406) may be updated to buffer numbers 0, 0, and 1, respectively.

3. This process may continue until the entire data packet CNTX1PKT0 may be received. In this example, the incoming data packet CNTX1PKT0 may occupy the buffer credits identified as buffer numbers 0, 1, 2, 3, and 4.

4. Upon receipt of the last chunk/portion of the data of data packet CNTX1PKT0, the Next buffer EOP list field associated with the second to last buffer number of this data packet (e.g., buffer number 3) may be updated to a "1" value. The EOP-DWORD-valid field in the CSRQ 400 for context 1 may also be updated (in this case, the value may remain as "0"). The tail free buffer pointer 424 may be updated to buffer number 4, and the head free buffer pointer 422 may be updated to buffer number 5.

5. Next, when data packet CNTX0PKT0 arrives, this data packet may use up buffer credits identified as buffer numbers 5, 6, 7, and 8. The various memories may also be updated similar to the description above in items 2 through 4.

6. When the last chunk/portion of data packet CNTX0PKT0 is buffered, the tail free buffer pointer 424 may be updated to buffer number 9, and the head free buffer pointer 422 may be updated to buffer number 10.

7. Next, data packet CNTX2PKT0 may arrive and it may occupy the buffer credit associated with buffer number 9. Accordingly, the tail free buffer pointer 424 may update to buffer number 10. The various memories may be updated as mentioned in items 2 to 5 above. Since this packet comprises a single buffer credit data packet, the EOP flag and EOP-DWORD-valid bits may be updated in the CSRQ context 2 entry indicating a single buffer credit packet to the read logic.

8. Then when data packet CNTX1PKT1 arrives, it occupies the buffer credits associated with buffer numbers 10, 11, 12, 13, 14, and 15. Correspondingly, the tail free buffer pointer 424 may now point to buffer number 16. The various memories may be updated as mentioned in items 2 to 5 above. Data packet CNTX1PKT0 may be linked or stitched to data packet CNTX1PKT1. Such linkage or stitching may be accomplished by accessing the CSRQ tail buffer pointer field associated with context 1, then link buffer number 4 to buffer number 10 in the PBLL memory 310. Also, the CSRQ tail buffer pointer field associated with context 1 may then be updated to buffer number 15.

9. Similarly, data packets CNTX0PKT1 and CNTX0PKT2 may be stored in buffer credit numbers 16, 17, 18, and 19. The various memories may be updated with values as shown in FIG. 5.

10. The Entry counter per context may be incremented accordingly for each data packet. The Entry counter may increment for every 4 DWORDs.

11. In order to transfer buffered data packets to the host, every data packet to be transferred may need to go through a Host buffer location lookup. The CSRQ packet number field for the context associated with the (head/first) data packet undergoing host buffer location lookup may be updated when the Host buffer location lookup completes irrespective of the success of the lookup or a blocked condition (e.g., based on an unsuccessful lookup). A successful lookup may be indicative of the host resource(s) associated with the same context as the data packet to be transferred being available and able to process the data packet. An unsuccessful lookup may be indicative of the host resource(s) associated with the same context as the data packet to be transferred not being available at the current time to process the data packet. The data packet may thus be considered to be "blocked" or subject to a blocked condition. By extension, the context associated with the blocked data packet may also be deemed to be blocked. The current unavailability may cause that buffered data packet to remain in the receive buffer data memory 314 until a subsequent lookup is successful.

Figure 7A:
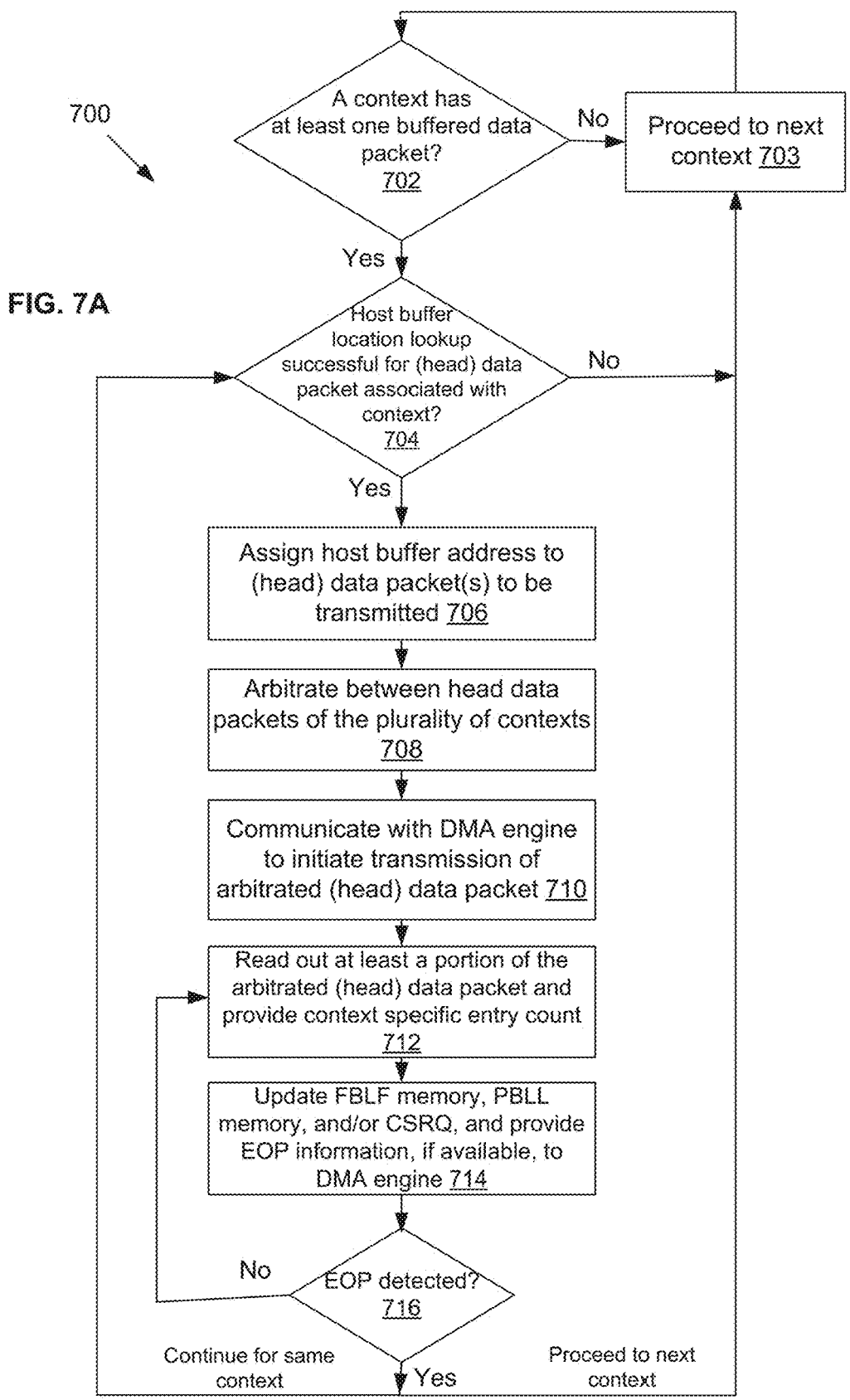
FIG. 7A depicts an example process that may be performed by a receive buffer to read out or transmit one or more data packets of a particular context buffered in a receive buffer data memory to the host compute node, according to some embodiments.

FIG. 7A depicts an example process 700 that may be performed by a receive buffer (e.g., receive buffer 107) to read out or transmit one or more data packets of a particular context buffered in the receive buffer data memory 314 to the host compute node, according to some embodiments.

At a block 702, the read control logic 304 may be configured to determine whether a context from among the plurality of contexts (e.g., an active context, a first context of the active contexts, a particular one of the active contexts associated with the largest number of buffered data packets, a particular one of the active contexts associated with buffer data packets occupying the largest number of buffer credits, etc.) has at least one data packet buffered in the receive buffer data memory 314. Such context may be referred to as the context of interest.

Since data packets may be buffered in the receive buffer data memory 314 in order to be delivered to the corresponding context-specific resources in the host (e.g., to appropriate host buffer location addresses), when no buffered data packet exists for the context of interest (no branch of block 702), then process 700 may proceed to block 703 and back to block 702 to proceed to the next context from among the plurality of contexts. Otherwise, at least one buffer data packet may exist for the context of interest (yes branch of block 702), and process 700 may proceed to block 704. In some embodiments, the read control logic 304 may access contents of the CSRQ state registers 306 to determine existence of data packet(s) associated with the context of interest.

At the block 704, the read control logic 304 in conjunction with the lookup logic 204 may be configured to perform a lookup of (or otherwise determine) a particular host buffer location address to which a data packet associated with the context of interest may be delivered or transmitted. In some embodiments, the data packet of interest may comprise the head or first data packet associated with the context of interest (e.g., the buffer number location of the head or first data packets may be identified in the head buffer pointer column 402 of the CSRQ 400). The read control logic 304 and/or lookup logic 204 may access one or more of the memories included in receive buffer 107 in order to perform the lookup operation. For example, lookup descriptor information associated with this (head) data packet stored in the lookup descriptor memory 308 may be used to perform the lookup. If the lookup operation is successful (e.g., a host buffer location address available to receive the data packet is identified) (yes branch of block 704), then process 700 may proceed to block 706. Otherwise upon an unsuccessful lookup (no branch of block 704), process 700 may proceed to block 703.

In some embodiments, one or more than one lookup attempt may be made for the data packet of interest in block 704. If all lookup attempts are unsuccessful or failures, then the data packet of interest and by extension, the associated context, may be deemed to be in a blocked condition or state. For whatever reason, the host may not have adequate resources at that point in time to perform the processing operations associated with the context of interest; and accordingly, the host may not or cannot accept (any) data packets for that particular context. Hence, this context may be deemed to be a blocked context. The host buffer location valid field associated with the context of interest in the CSRQ state registers 306 may be correspondingly be updated to a value of "0" to indicate the now blocked state or condition. The data packet of interest may thus be retained in the receive buffer data memory 314 and the (head) data packet associated with an unblocked state may "jump" over the data packet associated with the blocked state in being delivered to the host.

When the context of interest may be deemed to be in an unblocked state, at the block 706, the read control logic 304 in conjunction with the lookup logic 204 may be configured to assign the host buffer location address to the (head) data packet of interest based on the successful lookup performed in block 704. Next, at a block 708, the read control logic 304 may be configured to arbitrate among or between the head data packets of the plurality of contexts. A grant or permission may be obtained for the (head) data packet of interest to be the next to be transmitted to the host. The read control logic 304 may coordinate with other components, perform resource allocation, and/or other housekeeping functions in order for the (head) data packet of interest to be next to be transmitted, all prior to start of eviction of the (head) data packet from the receive buffer data memory 314 for delivery to the DMA engine 212 via the RXBUF-RXDMA interface 322. The DMA engine 212, in turn, may transmit the (head) data packet to the host compute node via the host interface logic 214.

Next at a block 710, the read control logic 304 may communicate with the DMA engine 212 to initiate transmission of the arbitrated (head) data packet. The arbitrated (head) data packet may be considered to be "presented" to the DMA engine 212 for eminent transmission thereto. The read control logic 304 in conjunction with the DMA engine 212 may read out at least a portion of the arbitrated (head) data packet, at a block 712. As discussed above in connection with FIG. 6, just as a data packet may be written into the receive buffer data memory 314 in chunks or portions (e.g., in buffer credit size chunks), a data packet may also be read out of the receive buffer data memory 314 in chunks or portions. In some embodiments, context specific entry count may also be "presented" to the DMA engine 212.

With at least a portion of the arbitrated (head) data packet read out, at a block 714, the read control logic 304 may be configured to update the FBLF memory 312, PBLL memory 310, and/or the CSRQ state registers 306 in accordance with the at least portion that has been or is being read out. For example, without limitation, the free buffer FIFO list and head free buffer pointer of the FBLF memory 312 may be updated; the head buffer pointer, tail buffer pointer, number of packets, and/or EOP-DWORD-valid fields of the CSRQ state registers 306 may be updated; and/or the next buffer link list and the next buffer EOP list of the PBLL memory 310 may be updated. Moreover, if an EOP buffer number value exists for the arbitrated (head) data packet, then such value may be provided to the DMA engine 212. Recall that a data packet that comprises a single buffer credit size may not have an associated EOP value.

When the EOP associated with the arbitrated (head) data packet may not be detected in a block 716, such detection indicates that there is more of the arbitrated (head) data packet to be read out (no branch of block 716), and process 700 return to block 712 to read out the next portion of the arbitrated (head) data packet. Conversely, if EOP has been detected (yes branch of block 716), then the entire arbitrated (head) data packet has been read out.

Upon completion of transmission of the arbitrated (head) data packet, transmission of one or more other data packets associated with the same context of interest may commence by returning to block 704, according to some embodiments. The new head data packet associated with the same context of interest may be read out, in which the new head data packet may comprise the data packet buffered in the memory 314 immediately after the arbitrated (head) data packet discussed above. For instance, the second data packet 502 (see FIG. 5) may comprise the arbitrated (head) data packet and the fifth data packet 508 may comprise the new head data packet.

In alternative embodiments, upon completion of transmission of the arbitrated (head) data packet, process 700 may read out a data packet from the next (or different) context from among the plurality of contexts by proceeding to block 703. The system 100 in such case may operate in a round robin format by reading out the (head) data packet for each of the successive unblocked contexts. In still other embodiments, system 100 may be configured to perform parallel operations, in which both the "continue for same context" branch and the "proceed to next context" branch of process 700 may be performed simultaneously with each other.

In this manner, data packet(s) associated with unblock context(s) may be provided to the host even if one or more data packets associated with blocked contexts exist and remain undelivered within the compute node interface. A data packet associated with a block context or condition may have been received at the receive buffer prior to a data packet associated with an unblocked context. In conventional FIFO-based or ring queue-type systems, the earlier queued/arrived data packet associated with the blocked context may prevent the later queued/arrived data packet associated with the unblock context from being delivered to the host. In embodiments of the present disclosure, a mechanism is provided in which the later queued/arrived data packet associated with the unblock context may be delivered to the host ahead of the earlier queued/arrived data packet associated with the blocked context, and further provides a mechanism to handle subsequent delivery of the data packets associated with blocked contexts as host resource availability changes to unblocked states for those blocked contexts.

Figure 7B:
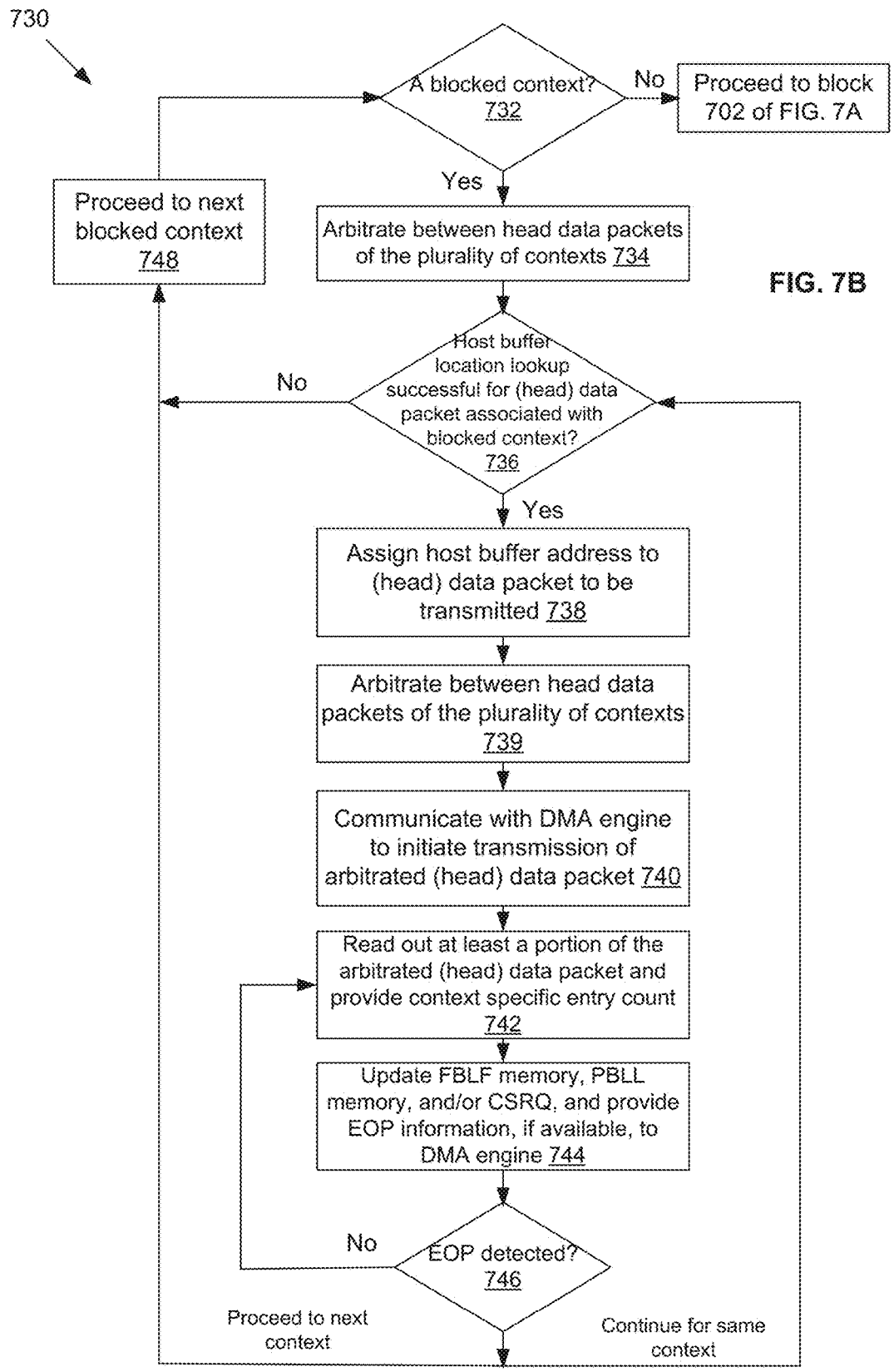
FIG. 7B depicts an example process that may be performed by a receive buffer to read out or transmit one or more data packets of blocked contexts buffered in the receive buffer data memory to the host compute node, according to some embodiments.

FIG. 7B depicts an example process 730 that may be performed by a receive buffer (e.g., receive buffer 107) to read out or transmit one or more data packets of blocked contexts buffered in the receive buffer data memory 314 to the host compute node, according to some embodiments. Data packets associated with blocked contexts may be revisited one or more times after the blocked condition occurs in order to deliver those data packets to the host as host resources become available to receive them. Process 730 may be performed in parallel with process 700, periodically, on-demand, based on some trigger, and/or the like.

At a block 732, the read control logic 304 may be configured to check whether a blocked context exists. The host buffer location valid field (column 408) of CSRQ 400 may be accessed to identify which contexts may be associated with a "0" value, for example. If no blocked contexts exists (no branch of block 732), then process 730 may proceed to block 702 of FIG. 7A (to return focus to delivery of unblocked data packets) or end.

When a blocked context may exist (yes branch of block 732), then at a block 734, the read control logic 304 may be configured to arbitrate among or between the head data packets of the plurality of contexts (e.g., especially among the plurality of unblocked contexts) for the (head) data packet associated with the blocked context of interest to be the next data packet to be transmitted to the host. The read control logic 304 may determine final queuing order, resource allocation, and/or other housekeeping functions prior to starting eviction of the (head) data packet associated with the blocked context of interest from the receive buffer data memory 314 for delivery to the DMA engine 212 via the RXBUF-RXDMA interface 322. The DMA engine 212, in turn, may transmit the (head) data packet to the host compute node via the host interface logic 214.

Upon completion of arbitration, the read control logic 304 in conjunction with the lookup logic 204 may be configured to perform a lookup of (or otherwise determine) a particular host buffer location address to which the (head) data packet associated with the blocked context of interest may be delivered or transmitted, at a block 736. The success of the lookup operation may determine whether the blocked condition may have changed to an unblocked condition for this context. Block 736 may be similar to block 704 of FIG. 7A.

For an unsuccessful lookup (no branch of block 736), process 730 may proceed to block 748, which may increment to the next blocked context, and then return to block 732 for the next blocked context. For a successful lookup (yes branch of block 736), the read control logic 304 in conjunction with the lookup logic 204 may be configured to assign the host buffer location address to the (head) data packet of interest based on the successful lookup performed in block 736, at a block 738. Block 738 may be similar to block 706 of FIG. 7A.

Next at a block 739, arbitration may be performed between the respective head data packets of the plurality of contexts for the (head) data packet of interest to be transmitted next to the host. Block 739 may be similar to block 708 of FIG. 7A.

Upon completion of arbitration, process 730 may proceed to a block 740, in which the read control logic 304 may communicate with the DMA engine 212 to initiate transmission of the arbitrated (head) data packet, similar to block 710 of FIG. 7A. In some embodiments, the read control logic 304 may also update the CSRQ state registers 306, such as changing the host buffer location valid field associated with the context of interest to indicate the change from a blocked to an unblocked state. Such update may be performed once for a given data packet or until the condition changes for the context of interest.

Blocks 742, 744, and 746 may then be performed for the arbitrated (head) data packet, in which blocks 742, 744, and 746 may be similar to respective blocks 712, 714, and 716 of FIG. 7A. Similar to the discussion above for FIG. 7A, when the EOP has not been detected for the arbitrated (head) data packet (no branch of block 746), process 730 may return to block 742 to continue reading out the rest of the arbitrated (head) data packet. Conversely, when EOP may be detected (yes branch of block 746), then process 730 may branch to the "proceed to next context" operations (e.g., proceeding to block 748) and/or the "continue for same context" operations (e.g., returning to block 736). As discussed above for FIG. 7A, other data packets from the same blocked context may be attempted to be delivered to the host (e.g., the "continue for same context" branch), the next blocked context may be checked for unblocked status change (e.g., the "proceed to next context" branch), or both may be performed in parallel operations, according to various embodiments of the present disclosure.

Continuing the example of the six data packets buffered in the receive buffer data memory 314, consider read out, release, or eviction of two of those data packets for transmission to the host in the following sequence or order: CNTX0PKT0 (the second data packet 502)->CNTX1PKT0 (the first data packet 500). Assume CNTX0PKT0 obtains a first grant for transmission to the host memory and that this data packet has been assigned a host buffer location.

The following operations may occur in connection with read out of data packets CNTX0PKT0 and CNTX1PKT0.

1. The CSRQ state registers 306 may contain sufficient information so as to trigger a data packet read from the receive buffer 107 for transfer to the host.

2. After arbitration is completed, the Head buffer number included in the CSRQ state registers 306 for context 0may be used for reading the buffered data packet CNTX0PKT0. The number of packets field may decremented by one. As and when each of the occupied buffer credits may be released (e.g., become available or free), these buffer credits may be appended to the Free Buffer FIFO list.

3. Whenever the read control logic 304 detects the next packet EOP buffer flag, the EOP buffer number value may be shared with to the DMA engine 212 to indicate the forthcoming end or last buffer credit read for data packet CNTX0PKT0.

4. At the end of the data packet transmission, the head buffer pointer in the CSRQ state registers 306 updates to the next data packet's head buffer number, which may be 16. The EOP-DWORD-valid field (also referred to as the EOP buffer flag) in the CSRQ state registers 306 for context 0 entry may also get updated to 1, as the next data packet for context 0 comprises a single buffer credit data packet. The Tail free buffer pointer updates to 3.

5. Next, data packet CNTX1PKT0 may be selected for transmission to the host.

6. The same events discussed above in items 2-5 may occur and the CSRQ state registers 306 associated with context 1 may be updated accordingly.

7. At the end of data packet CNTX1PKT0 transmission, the head buffer pointer (also referred to as the head packet buffer number) of the CSRQ state registers 306 associated with context 1 may be updated to the next data packet's head buffer number, e.g., updated to a value of 10.

Figure 8:
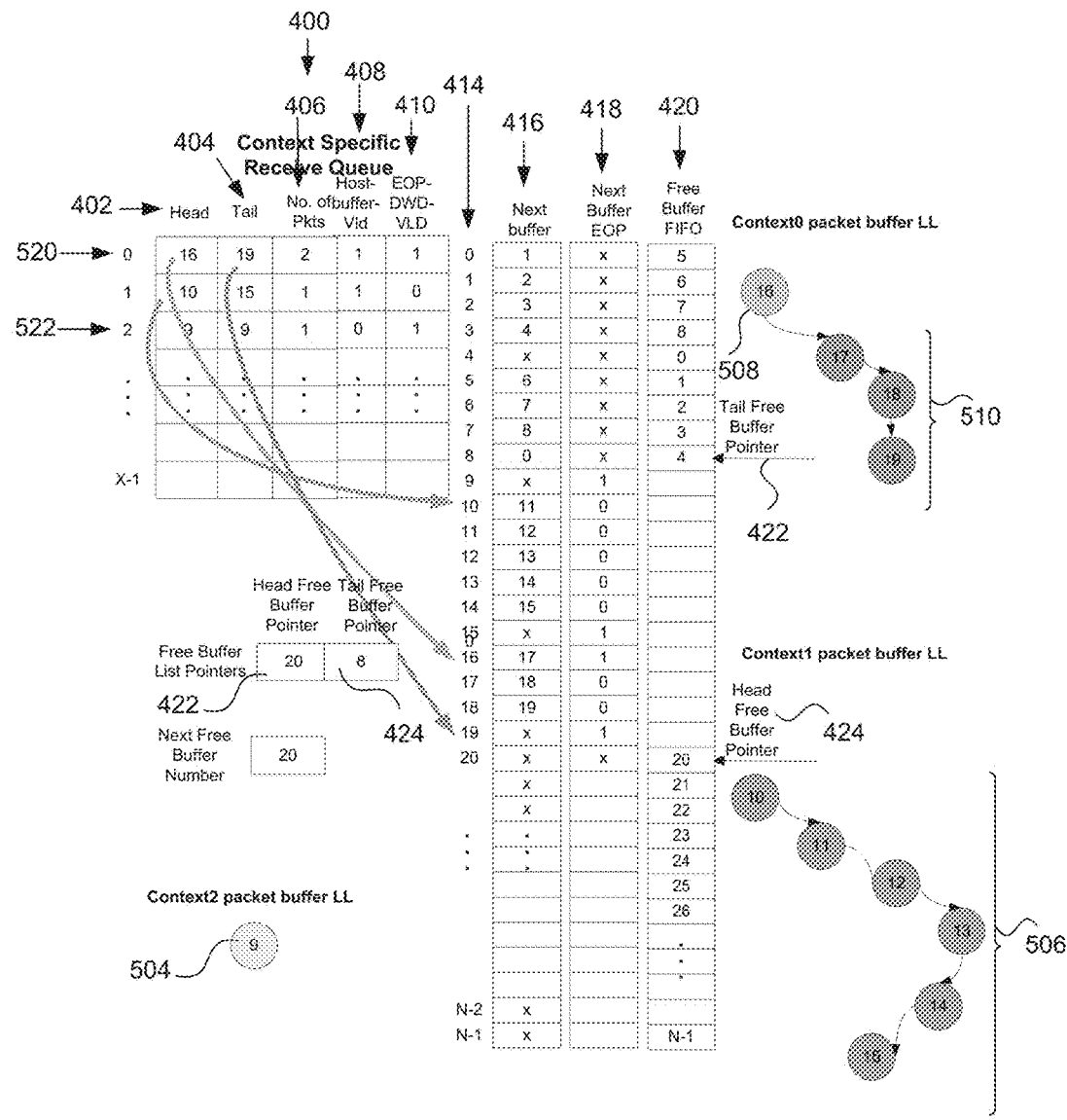
FIG. 8 illustrates an example depiction of the contents or state of the data structures shown in FIG. 5 after read out and transmission of select data packets to the host compute node, according to some embodiments.

FIG. 8 illustrates an example depiction of the contents or state of the data structures shown in FIG. 5 after read out and transmission of the second and first data packets 502, 500 to the host compute node in accordance with the discussion above, according to some embodiments. In comparison to FIG. 5, first data packet 500 previously shown within the context 1 section is absent in FIG. 8. Likewise, second data packet 502 previously shown within the context 0 section is absent in FIG. 8.

Figure 9:
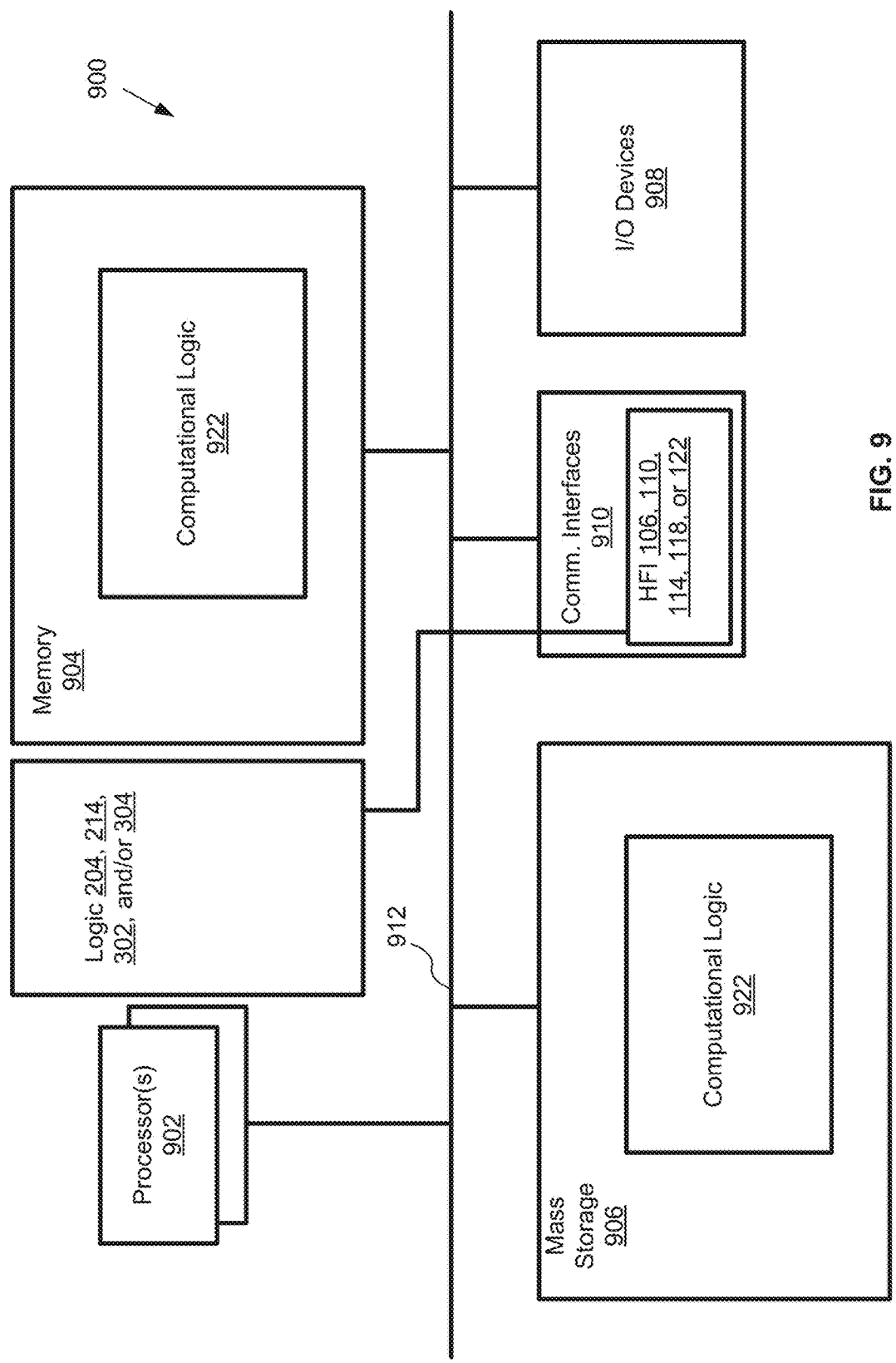
FIG. 9 illustrates an example computer device suitable for use to practice aspects of the present disclosure, according to some embodiments.

FIG. 9 illustrates an example computer device 900 suitable for use to practice aspects of the present disclosure, in accordance with various embodiments. In some embodiments, computer device 900 may comprise at least a portion of any of the switch 102, switch 103, compute node 104, compute node 108, compute node 112, compute node 116, compute node 120, compute node interface 106, compute node interface 110, compute node interface 114, compute node interface 118, and/or compute node interface 122. As shown, computer device 900 may include one or more processors 902, and system memory 904. The processor 902 may include any type of processors. The processor 902 may be implemented as an integrated circuit having a single core or multi-cores, e.g., a multi-core microprocessor. The computer device 900 may include mass storage devices 906 (such as diskette, hard drive, volatile memory (e.g., DRAM), compact disc read only memory (CD-ROM), digital versatile disk (DVD), flash memory, solid state memory, and so forth). In general, system memory 904 and/or mass storage devices 906 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computer device 900 may further include input/output (I/O) devices 908 such as a microphone, sensors, display, keyboard, cursor control, remote control, gaming controller, image capture device, and so forth and communication interfaces 910 (such as network interface cards, modems, infrared receivers, radio receivers (e.g., Bluetooth)), antennas, and so forth.

The communication interfaces 910 may include communication chips (not shown) that may be configured to operate the device 900 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 910 may operate in accordance with other wireless protocols in other embodiments. In embodiments, at least one of HFI 106, 110, 114, 118, or 122 may be disposed in communication interfaces 910.

The above-described computer device 900 elements may be coupled to each other via a system bus 912, which may represent one or more buses. In the case of multiple buses, they may be bridged by one or more bus bridges (not shown). Each of these elements may perform its conventional functions known in the art. In particular, system memory 904 and mass storage devices 906 may be employed to store a working copy and a permanent copy of the programming instructions to support the operations associated with system 100, e.g., in support of operations associated with one or more of logic 204, 214, 302, or 304 and/or one or more of HFI 106, 110, 114, 118, or 122 as described above, generally shown as computational logic 922. Computational logic 922 may be implemented by assembler instructions supported by processor(s) 902 or high-level languages that may be compiled into such instructions. The permanent copy of the programming instructions may be placed into mass storage devices 906 in the factory, or in the field, through, for example, a distribution medium (not shown), such as a compact disc (CD), or through communication interfaces 910 (from a distribution server (not shown)).

In some embodiments, aspects of computational logic 922 may be implemented in a hardware accelerator (e.g., Field Programmable Gate Arrays (FPGA)) integrated with, e.g., processor 902, to accompany the central processing units (CPU) of processor 902.

FIG. 10 illustrates an example non-transitory computer-readable storage media 1002 having instructions configured to practice all or selected ones of the operations associated with the processes described above. As illustrated, non-transitory computer-readable storage medium 1002 may include a number of programming instructions 1004 configured to implement support for one or more of logic 204, 214, 302, and/or 304, or bit streams 1004 to configure the hardware accelerators to implement some of the support of logic 204, 214, 302, and/or 304. Programming instructions 1004 may be configured to enable a device, e.g., computer device 900, in response to execution of the programming instructions, to perform one or more operations of the processes described in reference to FIGS. 1-8. In alternate embodiments, programming instructions/bit streams 1004 may be disposed on multiple non-transitory computer-readable storage media 1002 instead. In still other embodiments, programming instructions/bit streams 1004 may be encoded in transitory computer-readable signals.

Referring again to FIG. 9, the number, capability, and/or capacity of the elements 908, 910, 912 may vary, depending on whether computer device 900 may be used as a compute node, a storage node, a I/O node, a switch, a gateway, a router, or the number of processes computer device 900 is to support. Their constitutions are otherwise known, and accordingly will not be further described.

At least one of processors 902 may be packaged together with memory having computational logic 922 (or portion thereof) configured to practice aspects of embodiments described in reference to FIGS. 1-8. For example, computational logic 922 may be configured to include or access the support for one or more of logic 203, 214, 302, and/or 304.

In some embodiments, at least one of the processors 902 (or portion thereof) may be packaged together with memory having computational logic 922 or aspects thereof configured to practice aspects of processes 600, 700 to form a System in Package (SiP) or a System on Chip (SoC).

In various implementations, the computer device 900 may comprise a desktop computer, a server, a router, a switch, or a gateway. In further implementations, the computer device 900 may be any other electronic device that processes data.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein.

Examples of the devices, systems, and/or methods of various embodiments are provided below. An embodiment of the devices, systems, and/or methods may include any one or more, and any combination of, the examples described below.

Example 1 is an apparatus including a receive buffer that stores a first data packet associated with a first context, among a plurality of contexts, and a second data packet associated with a second context, among the plurality of contexts, wherein the first and second contexts identify respective first and second processes to be performed by a compute node in association with the respective first and second data packets, and the first and second data packets are stored in the receive buffer to be delivered to the compute node for operation of the first and second processes, wherein the receive buffer includes logic that is to determine that the compute node is unavailable to perform the first process with respect to the first data packet, determine that the compute node is available to perform the second process with respect to the second data packet, and read the second data packet for delivery to the compute node while the first data packet is retained.

Example 2 may include the subject matter of Example 1, and may further include wherein the receive buffer is to receive and store the first data packet prior to receipt and storage of the second data packet.

Example 3 may include the subject matter of any of Examples 1-2, and may further include a direct memory access (DMA) engine in communication with the compute node, and wherein the second data packet is transmitted from the receive buffer to the DMA engine for delivery to the compute node.

Example 4 may include the subject matter of any of Examples 1-3, and may further include wherein the receive buffer comprises a first-in-first-out (FIFO) buffer, a ring buffer, or a ring queue buffer.

Example 5 may include the subject matter of any of Examples 1-4, and may further include wherein the receive buffer is to receive the first data packet from a second compute node, via a network through which the two compute nodes are communicatively coupled.

Example 6 may include the subject matter of any of Examples 1-5, and may further include wherein the logic included in the receive buffer comprises hardware, firmware, an application specific integrated circuit (ASIC), programmable array logic (PAL), field programmable gate array (FPGA), circuitry, on-chip circuitry, or circuitry.

Example 7 may include the subject matter of any of Examples 1-6, and may further include wherein the receive buffer includes a receive buffer data memory organized as a plurality of buffer credits, a buffer credit of the plurality of buffer credits having a pre-determined memory size and a unique buffer address, and each of the first and second data packet is stored in select one or more buffer credits of the plurality of buffer credits.

Example 8 may include the subject matter of any of Examples 1-7, and may further include wherein the receive buffer includes context specific receive queue (CSRQ) registers, the CSRQ registers including a first buffer address in which a data packet associated with a particular context, among the plurality of contexts, is first stored in the receive buffer data memory, a last buffer address in which a data packet associated with the particular context is last stored in the receive buffer data memory, a count of a number of data packets associated with the particular context stored in the receive buffer data memory, an end of packet (EOP) flag indicative of the data packet associated with the particular context that is first stored in the receive buffer data memory being a single buffer credit size, and a host buffer location flag indicative of the compute node being available to perform a process associated with the particular context with respect to the data packet associated with the particular context that is first stored in the receive buffer data memory, and wherein the CSRQ registers include information about each context of the plurality of contexts.

Example 9 may include the subject matter of any of Examples 1-8, and may further include wherein the receive buffer includes a packet buffer link list (PBLL) memory, the PBLL memory including a next buffer link list that identifies successive buffer addresses of the receive buffer data memory in which data packets associated with a particular context of the plurality of contexts is stored and a next buffer end of packet (EOP) list that identifies whether a respective buffer address is the second to last buffer address in which a data packet of the data packets associated with the particular context is stored.

Example 10 may include the subject matter of any of Examples 1-9, and may further include wherein the PBLL memory includes a read port and a write port, the read and write ports accessed by the logic to deliver the second data packet to the compute node.

Example 11 may include the subject matter of any of Examples 1-10, and may further include wherein the receive buffer includes a free buffer list first-in-first-out (FIFO) (FBLF) memory, the FBLF memory including a free buffer FIFO list that identifies buffer addresses available to store incoming data packets, a head free buffer pointer indicative of a first available buffer address among the buffer addresses available that is available to store the incoming data packets, and a tail free buffer pointer indicative of a last available buffer address among the buffer addresses available that is available to store the incoming data packets.

Example 12 may include the subject matter of any of Examples 1-11, and may further include wherein the FBLF memory includes a read port and a write port, the read and write ports accessed by the logic to deliver the second data packet to the compute node.

Example 13 is a computerized method including determining, by a receive buffer, whether a host buffer location is available to accept delivery of a first data packet associated with a first context of a plurality of contexts, wherein the first data packet is buffered in the receive buffer and the first context identifies a first process to be performed by a host compute node including the host buffer location; when the host buffer location is determined to be unavailable for the first data packet, determining, by the receiver buffer, whether a host buffer location is available to accept delivery of a second data packet associated with a second context of the plurality of contexts, wherein the second data packet is buffered in the receive buffer and the second context identifies a second process to be performed by the host compute node including the host buffer location; and when the host buffer location is determined to be available for the second data packet, retaining the first data packet in the receive buffer and reading out at least a portion of the second data packet from the receive buffer.

Example 14 may include the subject matter of Example 13, and may further include arbitrating between head data packets associated with respective contexts of the plurality of contexts to obtain grant for a next transmission of a data packet to the host compute node to be the at least a portion of the second data packet, wherein the head data packets associated with respective contexts of the plurality of contexts comprise data packets first buffered in the receive buffer for respective contexts and the second data packet comprises a head data packet for the second context.

Example 15 may include the subject matter of any of Examples 13-14, and may further include updating one or more fields included in the receive buffer in accordance with the reading out of the at least a portion of the second data packet, wherein the one or more fields includes a first field that identifies a receive buffer location address in which a first portion of a head data packet associated with the second context is stored, a second field that identifies a count of data packets stored in the receive buffer associated with the second context, a third field that identifies a current availability or unavailability of the host buffer location in connection with the second context, a fourth field that identifies whether the head data packet associated with the second context comprises a data packet that is entirely stored in a single receive buffer location address that is of a pre-defined size, a fifth field that identifies a first available receive buffer location address to store a future data packet, and a sixth field that identifies a second to last receive buffer location addresses for respective data packets stored in the receive buffer.

Example 16 may include the subject matter of any of Examples 13-15, and may further include sequentially reading out remaining portions of the second data packet from the receive buffer until an end of the second data packet indicator included in the receive buffer matches a receive buffer location address from which the second data packet is read out.

Example 17 may include the subject matter of any of Examples 13-16, and may further include updating one or more of context specific receive queue (CSRQ) registers, a packet buffer link list (PBLL) memory, and a free buffer list first-in-first-out (FIFO) (FBLF) memory in accordance with the reading out of the at least a portion of the second data packet.

Example 18 may include the subject matter of any of Examples 13-17, and may further include receiving and buffering the first data packet in the receive buffer prior to receiving and buffering the second data packet in the receive buffer.

Example 19 may include the subject matter of any of Examples 13-18, and may further include wherein receiving and buffering the first data packet comprises receiving the first data packet from a second compute node via a network through which the host compute node and the second compute node are communicatively coupled.

Example 20 is a system including a compute node in a network; and a compute node interface in communication with the compute node, the compute node interface including a receive buffer that stores a first data packet associated with a first context of a plurality of contexts and a second data packet associated with a second context of the plurality of contexts, wherein the first and second contexts identify respective first and second processes to be performed by the compute node in association with the respective first and second data packets, and the first and second data packets are stored in the receive buffer to be delivered to the compute node for operation of the first and second processes, and wherein, when the compute node is unavailable to perform the first process with respect to the first data packet, the receive buffer is to determine that the compute node is available to perform the second process with respect to the second data packet and transmit the second data packet to the compute node prior to transmission of the first data packet.

Example 21 may include the subject matter of Example 20, and may further include wherein the receive buffer is to receive and store the first data packet prior to receipt and storage of the second data packet.

Example 22 may include the subject matter of any of Examples 20-21, and may further include wherein the compute node interface includes a direct memory access (DMA) engine in communication with the receive buffer, and wherein the second data packet is transmitted from the receive buffer to the DMA engine for transmission to the compute node.

Example 23 may include the subject matter of any of Examples 20-22, and may further include wherein the receive buffer comprises a first-in-first-out (FIFO) buffer, a ring buffer, or a ring queue buffer.

Example 24 may include the subject matter of any of Examples 20-23, and may further include a second compute node in the network; and a second compute node interface in communication with the second compute node, wherein the first data packet is transmitted from the second compute node to the second compute node interface to the compute node interface, via the network through which the compute node interface and the second compute node interface are communicatively coupled.

Example 25 may include the subject matter of any of Examples 20-24, and may further include wherein the receive buffer comprises hardware, firmware, an application specific integrated circuit (ASIC), programmable array logic (PAL), field programmable gate array (FPGA), circuitry, on-chip circuitry, or circuitry.

Example 26 may include the subject matter of any of Examples 20-25, and may further include wherein the receive buffer includes a receive buffer data memory organized as a plurality of buffer credits, a buffer credit of the plurality of buffer credits having a pre-determined memory size and a unique buffer address, and each of the first and second data packet is stored in select one or more buffer credits of the plurality of buffer credits.

Example 27 may include the subject matter of any of Examples 20-26, and may further include wherein the receive buffer includes context specific receive queue (CSRQ) registers, the CSRQ registers including a first buffer address in which a data packet associated with a particular context, among the plurality of contexts, is first stored in the receive buffer data memory, a last buffer address in which a data packet associated with the particular context is last stored in the receive buffer data memory, a count of a number of data packets associated with the particular context stored in the receive buffer data memory, an end of packet (EOP) flag indicative of the data packet associated with the particular context that is first stored in the receive buffer data memory being a single buffer credit size, and a host buffer location flag indicative of the compute node being available to perform a process associated with the particular context with respect to the data packet associated with the particular context that is first stored in the receive buffer data memory, and wherein the CSRQ registers include information about each context of the plurality of contexts.

Example 28 may include the subject matter of any of Examples 20-27, and may further include wherein the receive buffer includes a packet buffer link list (PBLL) memory, the PBLL memory including a next buffer link list that identifies successive buffer addresses of the receive buffer data memory in which data packets associated with a particular context of the plurality of contexts is stored and a next buffer end of packet (EOP) list that identifies whether a respective buffer address is the second to last buffer address in which a data packet of the data packets associated with the particular context is stored.

Example 29 may include the subject matter of any of Examples 20-28, and may further include wherein the receive buffer includes a free buffer list first-in-first-out (FIFO) (FBLF) memory, the FBLF memory including a free buffer FIFO list that identifies buffer addresses available to store incoming data packets, a head free buffer pointer indicative of a first available buffer address among the buffer addresses available that is available to store the incoming data packets, and a tail free buffer pointer indicative of a last available buffer address among the buffer addresses available that is available to store the incoming data packets.

Example 30 may include the subject matter of any of Examples 20-29, and may further include wherein the compute node interface includes hardware-based logic, context specific receive queue (CSRQ) registers, a packet buffer link list (PBLL) memory, and a free buffer list first-in-first-out (FIFO) (FBLF) memory, and wherein the hardware-based logic is to control creation and maintenance of characteristics and storage information associated with the first and second data packets in the receive buffer.

Example 31 is an apparatus including means for determining a first host buffer location to which a first data packet associated with a first context of a plurality of contexts is to be delivered to a host compute node, wherein the first data packet is buffered in the receive buffer and the first context identifies a first process to be performed by the host compute node including the first host buffer location; when the first host buffer location is determined to be unavailable for the first data packet, means for determining whether a second host buffer location is available to accept delivery of a second data packet associated with a second context of the plurality of contexts, wherein the second data packet is buffered in the receive buffer and the second context identifies a second process to be performed by the host compute node including the second host buffer location; and when the second host buffer location is determined to be available for the second data packet, means for retaining the first data packet in the receive buffer and means for delivering at least a portion of the second data packet from the receive buffer.

Example 32 may include the subject matter of Example 31, and may further include means for arbitrating between head data packets associated with respective contexts of the plurality of contexts to obtain grant for a next transmission of a data packet to the host compute node to be the at least a portion of the second data packet, wherein the head data packets associated with respective contexts of the plurality of contexts comprise data packets first buffered in the receive buffer for respective contexts and the second data packet comprises a head data packet for the second context.

Example 33 may include the subject matter of any of Examples 31-32, and may further include means for updating one or more fields included in the receive buffer in accordance with delivery of the at least a portion of the second data packet, wherein the one or more fields includes a first field that identifies a receive buffer location address in which a first portion of a head data packet associated with the second context is stored, a second field that identifies a count of data packets stored in the receive buffer associated with the second context, a third field that identifies a current availability or unavailability of the host buffer location in connection with the second context, a fourth field that identifies whether the head data packet associated with the second context comprises a data packet that is entirely stored in a single receive buffer location address that is of a pre-defined size, a fifth field that identifies a first available receive buffer location address to store a future data packet, and a sixth field that identifies a second to last receive buffer location addresses for respective data packets stored in the receive buffer.

Example 34 may include the subject matter of any of Examples 31-33, and may further include means for sequentially delivering remaining portions of the second data packet from the receive buffer until an end of the second data packet indicator included in the receive buffer matches a receive buffer location address from which the second data packet is read out.

Example 35 may include the subject matter of any of Examples 31-34, and may further include means for determining, at a later point in time after delivery of the second data packet to the host compute node, whether the first host buffer location is available to receive the first data packet, and upon an affirmative determination, means for delivering the first data packet to the host compute node.

Example 36 may include the subject matter of any of Examples 31-35, and may further include means for receiving and means for buffering the first data packet in the receive buffer prior to receiving and buffering the second data packet in the receive buffer.

Example 37 may include the subject matter of any of Examples 31-36, and may further include wherein the means for determining the first host buffer location to which the first data packet is to be delivered comprises means for performing a lookup of a host buffer location address to which the host compute node can accept the first data packet to perform the first process.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

We claim:

1. An apparatus comprising:
    a communication chip comprising a receive buffer that stores a first data packet associated with a first context, among a plurality of contexts, and a second data packet associated with a second context, among the plurality of contexts, wherein the first and second contexts identify respective first and second processes to be performed by a compute node in association with the respective first and second data packets, and the first and second data packets are stored in the receive buffer to be delivered to the compute node for operation of the first and second processes, wherein the receive buffer includes logic that is to determine that the compute node is unavailable to perform the first process with respect to the first data packet, determine that the compute node is available to perform the second process with respect to the second data packet, and read the second data packet for delivery to the compute node while the first data packet is retained.

2. The apparatus of claim 1, wherein the receive buffer is to receive and store the first data packet prior to receipt and storage of the second data packet.

3. The apparatus of claim 1, wherein the receive buffer comprises a first-in-first-out (FIFO) buffer, a ring buffer, or a ring queue buffer.

4. The apparatus of claim 1, wherein the logic included in the receive buffer comprises hardware, firmware, an application specific integrated circuit (ASIC), programmable array logic (PAL), field programmable gate array (FPGA), circuitry, on-chip circuitry, or circuitry.

5. The apparatus of claim 1, wherein the receive buffer includes a receive buffer data memory organized as a plurality of buffer credits, a buffer credit of the plurality of buffer credits having a pre-determined memory size and a unique buffer address, and each of the first and second data packet is stored in select one or more buffer credits of the plurality of buffer credits.

6. The apparatus of claim 5, wherein the receive buffer includes context specific receive queue (CSRQ) registers, the CSRQ registers including a first buffer address in which a data packet associated with a particular context, among the plurality of contexts, is first stored in the receive buffer data memory, a last buffer address in which a data packet associated with the particular context is last stored in the receive buffer data memory, a count of a number of data packets associated with the particular context stored in the receive buffer data memory, an end of packet (EOP) flag indicative of the data packet associated with the particular context that is first stored in the receive buffer data memory being a single buffer credit size, and a host buffer location flag indicative of the compute node being available to perform a process associated with the particular context with respect to the data packet associated with the particular context that is first stored in the receive buffer data memory, and wherein the CSRQ registers include information about each context of the plurality of contexts.

7. The apparatus of claim 5, wherein the receive buffer includes a packet buffer link list (PBLL) memory, the PBLL memory including a next buffer link list that identifies successive buffer addresses of the receive buffer data memory in which data packets associated with a particular context of the plurality of contexts are stored and a next buffer end of packet (EOP) list that identifies whether a respective buffer address is a second to last buffer address in which a data packet of the data packets associated with the particular context is stored.

8. The apparatus of claim 7, wherein the PBLL memory includes a read port and a write port, the read and write ports accessed by the logic to deliver the second data packet to the compute node.

9. The apparatus of claim 1, wherein the receive buffer comprises a free buffer list first-in-first-out (FBLF) memory and wherein the FBLF memory includes a read port and a write port, the read and write ports accessed by the logic to deliver the second data packet to the compute node.

10. A computerized method comprising:
determining, by a receive buffer within a communication chip, whether a host buffer location is available to accept delivery of a first data packet associated with a first context of a plurality of contexts, wherein the first data packet is buffered in the receive buffer and the first context identifies a first process to be performed by a host compute node including the host buffer location;
when the host buffer location is determined to be unavailable for the first data packet, determining, by the receiver buffer, whether a host buffer location is available to accept delivery of a second data packet associated with a second context of the plurality of contexts, wherein the second data packet is buffered in the receive buffer and the second context identifies a second process to be performed by the host compute node including the host buffer location; and
when the host buffer location is determined to be available for the second data packet, retaining the first data packet in the receive buffer and reading out at least a portion of the second data packet from the receive buffer.

11. The method of claim 10, further comprising arbitrating between head data packets associated with respective contexts of the plurality of contexts to obtain a grant for a next transmission of a data packet to the host compute node to be the at least a portion of the second data packet, wherein the head data packets associated with respective contexts of the plurality of contexts comprise data packets first buffered in the receive buffer for respective contexts and the second data packet comprises a head data packet for the second context.

12. The method of claim 11, further comprising updating one or more fields included in the receive buffer in accordance with the reading out of the at least a portion of the second data packet, wherein the one or more fields includes a first field that identifies a receive buffer location address in which a first portion of a head data packet associated with the second context is stored, a second field that identifies a count of data packets stored in the receive buffer associated with the second context, a third field that identifies a current availability or unavailability of the host buffer location in connection with the second context, a fourth field that identifies whether the head data packet associated with the second context comprises a data packet that is entirely stored in a single receive buffer location address that is of a pre-defined size, a fifth field that identifies a first available receive buffer location address to store a future data packet, and a sixth field that identifies a second to last receive buffer location address for respective data packets stored in the receive buffer.

13. The method of claim 10, further comprising sequentially reading out remaining portions of the second data packet from the receive buffer until an end of a second data packet indicator included in the receive buffer matches a receive buffer location address from which the second data packet is read out.

14. The method of claim 10, wherein receiving and buffering the first data packet comprises receiving the first data packet from a second compute node via a network through which the host compute node and the second compute node are communicatively coupled.

15. A system comprising:
a compute node in a network; and
a compute node interface in communication with the compute node, the compute node interface including a receive buffer in a communication chip that stores a first data packet associated with a first context of a plurality of contexts and a second data packet associated with a second context of the plurality of contexts, wherein the first and second contexts identify respective first and second processes to be performed by the compute node in association with the respective first and second data packets, and the first and second data packets are stored in the receive buffer to be delivered to the compute node for operation of the first and second processes, and wherein, when the compute node is unavailable to perform the first process with respect to the first data packet, the receive buffer is to determine that the compute node is available to perform the second process with respect to the second data packet and transmit the second data packet to the compute node prior to transmission of the first data packet.

16. The system of claim 15, wherein the compute node interface includes a direct memory access (DMA) engine in communication with the receive buffer, and wherein the second data packet is transmitted from the receive buffer to the DMA engine for transmission to the compute node.

17. The system of claim 15, further comprising:
a second compute node in the network; and
a second compute node interface in communication with the second compute node, wherein the first data packet is transmitted from the second compute node to the second compute node interface to the compute node interface, via the network through which the compute node interface and the second compute node interface are communicatively coupled.

18. The system of claim 15, wherein the receive buffer comprises hardware, firmware, an application specific integrated circuit (ASIC), programmable array logic (PAL), field programmable gate array (FPGA), circuitry, on-chip circuitry, or circuitry.

19. The system of claim 15, wherein the receive buffer includes a receive buffer data memory organized as a plurality of buffer credits, a buffer credit of the plurality of buffer credits having a pre-determined memory size and a unique buffer address, and each of the first and second data packet is stored in select one or more buffer credits of the plurality of buffer credits.

20. The system of claim 19, wherein the receive buffer includes a free buffer list first-in-first-out (FIFO) (FBLF) memory, the FBLF memory including a free buffer FIFO list that identifies buffer addresses available to store incoming data packets, a head free buffer pointer indicative of a first available buffer address among the buffer addresses available that is available to store the incoming data packets, and a tail free buffer pointer indicative of a last available buffer address among the buffer addresses available that is available to store the incoming data packets.

21. The system of claim 15, wherein the compute node interface includes hardware-based logic, context specific receive queue (CSRQ) registers, a packet buffer link list (PBLL) memory, and a free buffer list first-in-first-out (FIFO) (FBLF) memory, and wherein the hardware-based logic is to control creation and maintenance of characteristics and storage information associated with the first and second data packets in the receive buffer.

22. An apparatus comprising:
means for determining a first host buffer location in a host compute node to which a first data packet associated with a first context of a plurality of contexts is to be delivered, wherein the first data packet is buffered in a receive buffer in a communications chip and the first context identifies a first process to be performed by the host compute node;
when the first host buffer location is determined to be unavailable for the first data packet, means for determining whether a second host buffer location in the host compute node is available to accept delivery of a second data packet associated with a second context of the plurality of contexts, wherein the second data packet is buffered in the receive buffer and the second context identifies a second process to be performed by the host compute node; and
when the second host buffer location is determined to be available for the second data packet, means for retaining the first data packet in the receive buffer and means for delivering at least a portion of the second data packet from the receive buffer.

23. The apparatus of claim 22, further comprising means for updating one or more fields included in the receive buffer in accordance with delivery of the at least a portion of the second data packet, wherein the one or more fields includes a first field that identifies a receive buffer location address in which a first portion of a head data packet associated with the second context is stored, a second field that identifies a count of data packets stored in the receive buffer associated with the second context, a third field that identifies a current availability or unavailability of the host buffer location in connection with the second context, a fourth field that identifies whether the head data packet associated with the second context comprises a data packet that is entirely stored in a single receive buffer location address that is of a pre-defined size, a fifth field that identifies a first available receive buffer location address to store a future data packet, and a sixth field that identifies a second to last receive buffer location address for respective data packets stored in the receive buffer.

24. The apparatus of claim 22, further comprising means for determining, at a later point in time after delivery of the second data packet to the host compute node, whether the first host buffer location is available to receive the first data packet, and upon an affirmative determination, means for delivering the first data packet to the host compute node.

25. The apparatus of claim 22, wherein the means for determining the first host buffer location to which the first data packet is to be delivered comprises means for performing a lookup of a host buffer location address to which the host compute node can accept the first data packet to perform the first process.

* * * * *